(12) United States Patent
Ponomarev et al.

(10) Patent No.: US 9,396,437 B2
(45) Date of Patent: Jul. 19, 2016

(54) INTERFACE APPARATUS AND METHOD FOR PROVIDING INTERACTION OF A USER WITH NETWORK ENTITIES

(71) Applicant: Mera Software Services, Inc., Santa Clara, CA (US)

(72) Inventors: Dmitrii Maximovich Ponomarev, Nizhny Novgorod (RU); Nikolay Nikolaevich Mikhaylov, Vyazniky (RU)

(73) Assignee: Mera Software Services, Inc., Santa Clara, CA (US)

( * ) Notice: Subject to any disclaimer, the term of this patent is extended or adjusted under 35 U.S.C. 154(b) by 0 days.

(21) Appl. No.: 14/613,696

(22) Filed: Feb. 4, 2015

(65) Prior Publication Data
US 2015/0154492 A1 Jun. 4, 2015

Related U.S. Application Data

(63) Continuation-in-part of application No. 14/162,857, filed on Jan. 24, 2014.

(30) Foreign Application Priority Data

Nov. 11, 2013 (IL) .......................................... 229370

(51) Int. Cl.
G06F 17/00 (2006.01)
G06F 17/20 (2006.01)
(Continued)

(52) U.S. Cl.
CPC .. *G06N 5/04* (2013.01); *A63H 3/28* (2013.01); *G06N 3/004* (2013.01); *G09B 5/04* (2013.01); *H04L 67/10* (2013.01); *A63H 2200/00* (2013.01)

(58) Field of Classification Search
None
See application file for complete search history.

(56) References Cited

U.S. PATENT DOCUMENTS 6,149,490 A 11/2000 Hampton et al.
6,773,344 B1 8/2004 Gabai et al.
(Continued)

FOREIGN PATENT DOCUMENTS

WO 00/31656 6/2000
WO 0169572 9/2001
(Continued)

OTHER PUBLICATIONS

Schmid, S., et al., "Networking Smart Toys with Wireless ToyBridge and ToyTalk," Proc. IEEE Infocom (poster abstract), Apr. 2011, pp. 1-2, Shanghai, China.
(Continued)

*Primary Examiner* — Luis Sitiriche
(74) *Attorney, Agent, or Firm* — Jose Gutman; Fleit Gibbons Gutman Bongini & Bianco P.L.

(57) ABSTRACT

An interface apparatus, system and method for providing interaction over a communication network between a user and network entities are described. The interface apparatus includes a front-end communication system configured for receiving user input information and for outputting output signals in response to the input information. The interface apparatus also includes a communication processing system for coding the input information and forwarding it to the network entity. The interface apparatus can also include a front-end monitoring system for generating user state patterns indicative of the state of the user, a decision-making system for processing the patterns and taking a decision as to how to respond thereto. The interface apparatus includes a configuration and control system configured for reconfiguration and control of functionality of the interface apparatus and for reconfiguration and control of functionality of the network entities.

22 Claims, 4 Drawing Sheets

(51) Int. Cl.
　　　*G06N 5/04*　　　(2006.01)
　　　*G06N 3/00*　　　(2006.01)
　　　*G09B 5/04*　　　(2006.01)
　　　*H04L 29/08*　　(2006.01)
　　　*A63H 3/28*　　　(2006.01)

(56) References Cited

U.S. PATENT DOCUMENTS

| | | |
|---|---|---|
| 7,016,849 B2 | 3/2006 | Arnold et al. |
| 7,092,928 B1 | 8/2006 | Elad et al. |
| 2004/0014014 A1* | 1/2004 | Hess .................. G09B 23/28 434/236 |
| 2004/0147814 A1 | 7/2004 | Zancho et al. |
| 2006/0036751 A1 | 2/2006 | Garbow et al. |
| 2008/0305784 A1* | 12/2008 | Dillinger .................. H04W 8/22 455/418 |
| 2009/0253554 A1 | 10/2009 | McIntosh |
| 2010/0167623 A1 | 7/2010 | Eyzaguirre et al. |
| 2010/0197411 A1 | 8/2010 | Eyzaguirre et al. |
| 2011/0053129 A1* | 3/2011 | Basson .................. G09B 19/00 434/238 |
| 2012/0158158 A1 | 6/2012 | Spring |
| 2013/0102852 A1 | 4/2013 | Kozloski et al. |

FOREIGN PATENT DOCUMENTS

| | | |
|---|---|---|
| WO | 0169799 | 9/2001 |
| WO | 0169829 | 9/2001 |
| WO | 0170361 | 9/2001 |

OTHER PUBLICATIONS

Office Action dated May 8, 2014 received for Israeli Patent Application No. 229370.

* cited by examiner

INTERFACE APPARATUS AND METHOD FOR PROVIDING INTERACTION OF A USER WITH NETWORK ENTITIES

FIELD OF THE INVENTION

This invention relates to the field of interactive systems and methods for entertainment, education and therapy of children, and in particular, to an interactive personal companion apparatus and method for providing communication of users with entities over communication networks.

BACKGROUND OF THE INVENTION

Traditionally, toys are designed for entertainment, education and amusement of children. Due to their tactile proximity, children derive fun and comfort from toys. Additionally, children can be provided with toys, such as dolls, teddy bears or plush animals that can also be used as transitional objects or companions, to reduce strain and allow for regaining psychic equilibrium, thus helping a young individual to cope with past and present trauma, anxiety, depression and psychic pain. A typical example of a transitional object is a baby blanket that is carried everywhere and that the child sleeps with for comfort. Adults can also benefit from the proximity of an object that offers tactile contact and that soothes or that even can render soothing words. In this connection, toys and other interactive companion devices are most beneficial when they can actively respond to commands of the user rather than behave passively in the manner of traditional toys.

There are known various types of toys for children that can be associated with recording and playback equipment, for example, with speakers so the toys can communicate with a user. There are known toys which can be responsive to triggering external user inputs, such as touch or spoken words or sounds. For example, U.S. Pat. No. 6,890,239 to Kopelle describes a transitional companion in the form of a talking therapy buddy for providing reassurance to a person and for self-healing. The therapy buddy includes a body assembly with an outer covering of soft material and an interior body cavity, a head portion having a face with calm and tranquil features, two elongated flexible arms and legs, an electronic circuit including a sound module housed in the body cavity and a power source. A plurality of switching means are provided covered by the outer covering, and associated with the legs of the assembly and connected to the electronic circuit so as to provide a switch signal response to a person's touching of the respective leg portion switch. The sound means can include a voice synthesizing means for electronic synthesizing a plurality of soothing, reassuring, comforting, and universal words in response to a switch signal provided. The voice synthesizing means includes speaker means for audibilizing the electronically synthesized words.

There are known more sophisticated toys which can respond to signals transmitted through a television program or a computer so that the toys appear to react to the television program or computer. For example, U.S. Pat. No. 6,773,344 to Gabai et al. describes methods and apparatus for integrating interactive toys with interactive television and cellular communication systems. Interactive toys have real time conversations with users, employing speech recognition. Interactive toys are connected to an interactive toy server which is connected to entertainment, education, sales promotion and other content providers via Internet communication systems. Such a connection may utilize, for example, telephone lines, cellular communication systems, coaxial cables, satellite, DSL or other broadband systems. Interactive toys may be connected, via a wireless link, to a computing device such as a home computer, an interactive television set-top box or a base unit which provides Internet connectivity for the toy. Interactive toys may support mobile cellular or satellite communication. These toys are able to provide entertainment, education, sales promotion and other content to a user. Content is provided to users for their toys, which enables toys to form relationships with users. Interactive toys further utilize user knowledge bases to match entertainment, education and sales promotion content to user histories, behaviors and habits. Content is thus personalized to an individual user as well as to a user's environment including the user's location and the time at which the toy is used. Integration of content, such as entertainment, education and sales promotion is provided by merging interactive television techniques with interactive toys.

International Patent Application No. WO2012/014211 to Cohen et al describes a toy apparatus and method for interactive communication between a cellphone and a toy. The method includes transmitting by the cellphone at least one signal; receiving and analyzing by the toy apparatus this signal; determining and producing by the toy apparatus a response to this signal.

SUMMARY OF THE INVENTION

There is a need in the art to provide a smart toy apparatus equipped with a wireless communication platform that can operate as an interface for interaction between a user (e.g., a child) and the surrounding external world including various entities that are systems configured for providing various network communication services accessible in cyber-space.

It would be beneficial to have an interface apparatus implemented in the form of a smart toy that can provide the possibility of enhanced interactive communication with children that may play and use such toys for communication with various entities over a communication network. In particular, such smart toys having an embedded wireless communication platform together with an intelligent communication system may be used for interaction with network entities in order to respond to requests from the users, measure vital signs of the users, control physiological and emotional states of the users and provide requested information targeted from different network entities to the user.

It would also be advantageous to have a smart toy interface apparatus that can have the capabilities to interact with children, and also provide interactive communication between the children and the network entities for teaching various subjects. Thus, children will be able to receive new, useful knowledge through interaction with such a device. These features can significantly increase the value of toys for children, for example, through more interesting, exciting and useful learning and gameplay.

It would be helpful to have the possibility of automatic reconfiguration and control of functionality of the interface apparatus in order to automatically adjust the interface apparatus to changes in operating conditions of the communication network.

It would also be beneficial to have the possibility of automatic reconfiguration and control of functionality of the network entities in order to adjust their operation to predetermined requirements, thus ensuring most effective interaction between the interface apparatus and the network entities.

Thus, the present application partially eliminates disadvantages of conventional interactive toys that can respond to signals transmitted from a computer, and provides an enhanced user interface apparatus that can be adaptive and smart for interaction with various cloud network entities.

According to a general aspect, the present invention provides a technique that allows for access to various services provided by network entities by using a smart interface apparatus. Although most of the applications of the interface apparatus of the present application will be addressed to children and young users, it should be understood that adults can also utilize this apparatus, and thus benefit from the advantages provided by the present invention.

According to some embodiments of the present invention, the interface apparatus can be implemented in the form of interactive toys, such as stuffed animals, dolls, toy robots or any other figurines that include electronics, however other implementations are also contemplated. When desired, the interface apparatus can be implemented in the form of a smart baby carriage or a stroller. Likewise, the interface apparatus can be realized in the form of a baby cot, as well as in the form of a specialized garment for children, which can be equipped with a set of front-end sensors configured to monitor the state of the child and his current location, etc. In order to provide interactive communication with a child, the interface apparatus can be equipped with a microphone, a speaker, a camera, a display and other devices.

The technique described in this application employs a communication network to provide interaction between an interface apparatus and a plurality of network entities equipped with systems configured for providing different services to the users of the interface apparatuses under a predetermined service agreement. The network entities can, for example, be deployed and run by a dedicated Interface Apparatus Provider, which provides access of the interface apparatus to the network entities via the communication network, such as the global Internet or an internal communication network of the Interface Apparatus Provider.

Users (e.g., children) of the interface apparatus or their supervisors (e.g., parents) can subscribe the apparatus to one or more network services provided by the network entities. Such subscription can, for example, be carried out during purchase of a smart interface apparatus, or at a later stage. During the subscription procedure, the user or his supervisor may establish a predetermined service agreement (e.g., in the form of a contract) with the Interface Apparatus Provider. This predetermined service agreement includes a list of the services that the users and/or the supervisor of the user wish to receive during exploitation of the interface apparatus. The agreement can also include a list of the functional characteristics of the provided services, which are assigned to the given interface apparatus and stored within this interface apparatus.

The list of services includes, but is not limited to, a natural language dialog service that provides interaction of the user with the interface apparatus in a natural language, a monitoring service that provides identification of the situations that occurred with the user, a supervisor communication support service that allows a supervisor to monitor the user's behavior and provide a communication with the user when required, and a peer communication support service that provides a communication between the interface apparatuses that allows the users (e.g., children) associated with these interface apparatuses to place calls to each other, and thereby to communicate with each other over the network.

In addition to the predetermined service agreement, the interface apparatus stores predetermined service requirements. The service requirements are descriptions of the technical requirements imposed on the services provided by the network entities in order to provide those functional characteristics of these services which are required to the specific interface apparatus for seamless interoperability (i.e., interaction with each other for simultaneous operation together) of this interface apparatus with the corresponding entities. In particular, these predetermined service requirements declare types of the services which are assigned to the given interface apparatus and parameters of these services (service parameters) provided to the interface apparatus.

An example of the predetermined service requirements for the natural language dialog service includes, but is not limited to, a possibility of such a functional characteristic of this service as recognizing the speech in a certain language, a possibility of the service to identification of an emotional state of the user from his speech, and a requirement on the dialog service to support the interoperation by using the same formats for the coded signals which are received from the entity by the interface apparatus and transmitted from the interface apparatus to entity.

An example of the predetermined service requirements for monitoring service includes, but is not limited to, a requirement on the monitoring service to recognize a certain physiological and emotional state of the user, a requirement that formats of the monitoring data used in the interface apparatus are compatible with the formats used in the corresponding entity that provides monitoring service.

Thus, both predetermined service agreements and predetermined service requirements are used during interoperation between an interface apparatus and network entities to which services the interface apparatus is subscribed in order to provide optimal, seamless and smooth access of the user to these services.

Due to the operation of different monitoring devices built into the interface apparatus of the present invention, such as front-end sensors, a video camera, a microphone, etc., the operation functionality of the interface apparatus can be automatically adapted to the character, behavior and requirements of the particular user. The data signals from the monitoring devices can be obtained and analyzed for providing control of physiological and emotional states of the user, for example, by providing advice to the user and targeting required information from various network entities to the user.

According to some embodiments of the present invention, the adaptability of the interface apparatus to the individual character, mood, behavior and requirements of a particular child can also be achieved not only by the tools which are built into the child interface apparatus itself, but can also be achieved through the infrastructure of the external network components, for example through the specialized M2M services deployed on the basis of cloud technologies on Internet servers, which can be available for the interface apparatus via wireless communication, such as: WiFi, Long-Term Evolution (marketed as 4G LTE), Worldwide Interoperability for Microwave Access (WiMAX), and also other wireless standards and protocols.

Depending on the information obtained about a user, the type of interaction of the interface apparatus with the user can be adjusted depending on the features of the particular user, such as user's age, gender, emotional and physiological state, etc. It can also be adjusted to the instant situation accordingly in the context of this interaction.

Various scenarios are contemplated for using the interface apparatus of the present invention for interaction with various network entities.

In particular, when the interface apparatus is implemented as a toy, it can employ voice dialogues for communication with the child. The voice dialogues can be conducted in natural (ordinary) languages by interactively talking with and listening to the child, and answering the child's questions. When desired, such dialogues may be thematic and directed to a certain purpose.

When desired, such dialogues with the toy interface apparatus can be implemented for playing educational games. In this case, a cognitive dialogue can be created around a predefined topic, so that the child can be actively involved in the process of acquiring new knowledge.

In particular, when the interface apparatus is used as a transitional object or a companion, the technical means for organization and conducting relatively simple dialogues can be built into the interface apparatus itself. However, in the case of entertainment, education or amusement of the child, the corresponding technical means for conducting more complex dialogues can already be deployed in the external entity rather than in the interface apparatus itself. In this case, the entity can, for example, be a personal computer (or a laptop) operating within a home network. Further, in the case of most sophisticated topics for dialogues, the dedicated machine-to-machine (M2M) services can be deployed on the dedicated servers by using various Internet cloud-based technologies, which can be available to the interface apparatus for the organization and conduction of such dialogues through wireless communication.

When desired, the interface apparatus can operate in the "child care" scenario. In this case, the interface apparatus allows the parents permanently to watch over the child and receive information about the child's behavior, and the child's emotional and physiological states. In particular, with the help of a video camera and microphone built into the toy interface apparatus, the parents can watch and listen to the child by using their smart phone, tablet laptop, notebook or other smart communication devices. When a built-in GPS receiver is used in the toy interface apparatus, the parents can also keep track of the whereabouts of the child carrying his interface apparatus.

According to some embodiments of the present invention, the interface apparatus can be equipped with various monitoring sensors configured for measuring physiological parameters of the user, such as his temperature, pulse rate, skin resistance, etc. This provision allows monitoring the health of the child user, and in the case of emergency, to respond to measured vital signs, if the signs indicate health disorders or diseases.

It is also advantageous that such measurements can be carried out in a child-friendly manner. For example, when the interface apparatus is in the form of a child's favorite teddy bear, various front-end monitoring devices and sensors can be arranged in a paw of the toy. In operation, the teddy bear may, for example, utter: "Let's be friends! Dear friend, please take my paw, etc." Accordingly, when the child picks up the toy by the paw, the toy can measure the child's temperature. In this case, if the temperature is not normal, a special notice can be generated and transferred to the parents of the child, for example to their communication device, such as a smart phone, a tablet computer, a laptop, a smart TV, etc.

According to some embodiments of the present invention, a video image of the child, as well as a sound of his voice can be captured by a front-end video camera and microphone built into the apparatus, respectively, and then be transmitted via the Internet to the corresponding M2M remote monitoring services, where these signals may also be combined with information obtained from various front-end sensors built into the apparatus. A decision making system can be employed in the interface that can carry out a detailed analysis of the data and identify various situations associated with the child, e.g., crying, laughing, running, sitting, standing, etc.

According to some embodiments of the present invention, the interface apparatus can be configured for identification of certain diseases having external manifestation, e.g., epilepsy, etc. Based on conversations with the child, the motor skills of his speech and his motor activity, the apparatus can recognize different abnormalities in the development of the child.

According to some embodiments of the present invention, on the basis of Internet protocol telephony (IP telephony) technologies, the interface apparatus can maintain remote communication between several users using similar interface apparatuses. When desired, the interface apparatus may imitate the basic communication functions of an IP phone. For example, by using the interface apparatus of the present invention, children can call to their peer friends (e.g., via the Internet with the support of a specialized M2M service) and chat with them.

These and other useful features and properties of the smart interactive interface apparatus of the present invention can significantly boost its consumer properties in the market, and make them more attractive and competitive for buyers.

For the purpose of the present application, the term "network entity" refers to sources and recipients of data signals transmitted from the interactive interface apparatus of the present invention over a communication network. The network entities can, for example, represent people, organizations, other communication systems, computer systems, etc.

The terms "front-end" and "back-end" are used to characterize devices, program interfaces and services relative to the initial user of these interfaces and services. The "user" may be a child or an adult.

Thus, according to one general aspect of the present invention, there is provided an interface apparatus for providing interaction over a communication network between a user and a plurality of network entities cooperating with said interface apparatus.

According to some embodiments of the present invention, the interface apparatus includes a front-end communication system including one or more front-end communication input devices and one or more front-end communication output devices. The front-end communication input devices are configured for interaction with the user for receiving user input information and for generating user information input signals. The front-end communication output devices are configured for interaction with the user for outputting user information output signals obtained as reactions to the user input information.

According to some embodiments of the present invention, the interface apparatus also includes a communication processing system coupled to the front-end communication system. The communication processing system is configured for receiving user information input signals for coding thereof to a format suitable for data transfer and forwarding coded information input signals to one or more network entities over the communication network. The network entities are configured for handling communication with the user. The communication processing system is also configured for receiving coded information output signals and decoding these signals to obtain user information output signals in a format suitable for outputting thereof by one or more front-end output devices.

According to some embodiments of the present invention, the interface apparatus further includes a front-end monitoring system including one or more front-end monitoring devices configured for interacting with the user, collecting user state information related to a state of the user, and generating user state patterns indicative of the state of the user.

According to some embodiments of the present invention, the interface apparatus further includes a decision-making system coupled to the front-end monitoring system and configured for receiving user state patterns collected by the front-end monitoring devices, and for processing thereof for taking a decision as to how to respond to the received user state patterns.

According to some embodiments of the present invention, the interface apparatus further includes a configuration and control system configured for (i) automatic reconfiguration and control of functionality of the interface apparatus, that includes selection of desired functional characteristics of the interface apparatus, and adjustment of the interface apparatus to operating conditions of the communication network, and (ii) automatic reconfiguration and control of functionality of the network entities to adjust operation of the network entities to the predetermined requirements imposed thereon for desired cooperation with the interface apparatus.

According to some embodiments of the present invention, the interface apparatus further includes a wireless network connector electrically coupled to the decision-making system, to the communication processing system, and to the configuration and control system. The wireless network connector is configured for providing a wireless signal linkage between the interface apparatus and the plurality of the network entities over the communication network.

According to some embodiments of the present invention, the interface apparatus further includes an interface for remote monitoring (hereinafter also referred to as "remote monitoring interface") coupled to the communication processing system and to the decision-making system. The interface for remote monitoring is configured for interaction of the interface apparatus with the plurality of network entities.

According to some embodiments of the present invention, the front-end communication input devices of the front-end communication system include a microphone configured for receiving user input information provided verbally and converting user information into user information input signals corresponding to user verbal input information.

According to some embodiments of the present invention, the front-end communication input devices of the front-end communication system include a video camera configured for receiving user information provided visually and converting user information into user information input signals corresponding to visual user information.

According to some embodiments of the present invention, the front-end communication output devices of the front-end communication system include a speaker configured for audio outputting user information output signals, and a display configured for video outputting user information output signals. The user information output signals are indicative of reactions of one or more network entities on the user information input signals.

Examples of front-end monitoring devices of the front-end monitoring system include, but are not limited to, a tactile sensor configured to provide user state information indicative of a force applied by the user to the interface apparatus; one or more user physiological parameter sensors configured for measuring at least one vital sign of the user; a user location sensor configured for determination of a location of the interface apparatus; an accelerometer configured for detecting motion of the interface apparatus; and a gyroscope configured for measuring orientation of the interface apparatus in space. Examples of user physiological parameter sensors include, but are not limited to a temperature sensor, a pulse rate sensor, a blood pressure sensor, a pulse oximetry sensor, and a plethysmography sensor.

According to some embodiments of the present invention, the communication processing system includes an encoding and decoding module coupled to the front-end communication input devices and to the front-end communication output devices of the front-end communication system.

According to some embodiments of the present invention, the encoding and decoding module is configured for receiving user information input signals including audio and video signals from the front-end communication input devices for coding thereof, and for forwarding coded information input signals to the wireless network connector for relaying coded information input signals to one or more network entities.

According to some embodiments of the present invention, the encoding and decoding module is further configured for receiving coded information output signals and decoding these signals to obtain user information output signals.

According to some embodiments of the present invention, the communication processing system also includes a speech synthesizer coupled to the speaker and to the module for encoding and decoding audio signals. The speech synthesizer is configured to receive decoded information output signals and to generate electrical signals in a format suitable for audio-outputting thereof by the speaker.

According to some embodiments of the present invention, the communication processing system also includes a view synthesizer coupled to the display and to the module for encoding and decoding video signals, and configured to receive decoded information output signals and to generate electrical signals in a format suitable for video-outputting thereof by the display.

According to some embodiments of the present invention, the interface apparatus further includes a local dialogue organization device coupled to the speech synthesizer and to the remote monitoring interface. The local dialogue organization device is configured for organization of a dialogue between the user and the interface apparatus.

According to some embodiments of the present invention, the decision-making system includes a sensor data collection module configured for receiving user state patterns measured by the front-end monitoring system and formatting thereof.

According to some embodiments of the present invention, the decision-making system also includes a pattern recognition device coupled to the sensor data collection device. The pattern recognition device is configured for comparing user state patterns with reference state patterns stored in the interface apparatus, and for generating an identification signal indicative of whether at least one of the user state patterns matches or does not match at least one reference state pattern. The reference state patterns are indicative of various predetermined states of the user and are used as a reference for determining a monitored state of the user.

According to some embodiments of the present invention, the decision-making system also includes a pattern storage device coupled to the pattern recognition device and configured for storing the reference state patterns.

According to some embodiments of the present invention, the decision-making system also includes a decision maker device coupled to the pattern recognition device. The decision maker device is configured to receive the identification signal from the pattern recognition device, and in response to said identification signal, to generate coded information output signals indicative of at least one policy for taking a decision as to how to respond.

According to some embodiments of the present invention, the decision-making system also includes a policy storage device coupled to the decision maker device and configured for storing policies for taking the decision.

According to some embodiments of the present invention, the policy for taking the decision includes at least the following two actions:

(1) if at least one of the user state patterns matches at least one reference state pattern, to generate the coded information output signals indicative of advice of the decision-making system as a reaction to the monitored state of the user, and to provide e coded information output signals to at least one receiver selected from a corresponding at least one network entity configured for handling the advice, and the communication processing module of the interface apparatus for decoding thereof and providing advice to the user; and (2) if none e of the user state patterns matches at least one reference state pattern, the policy for the taking of the decision includes instructions to forward the monitored user state patterns to a corresponding at least one network entity selected from the plurality of network entities. The corresponding at least one network entity is configured for handling the user patterns.

According to some embodiments of the present invention, the configuration and control system includes a cyber certificate database. The cyber certificate database includes at least one record selected from: a record with a description of functional characteristics of the interface apparatus; a record with a description of functional characteristics of the network entities selected to cooperate with the interface apparatus for a predetermined purpose; a record with a description of functional characteristics of said plurality of network entities providing services to which the interface apparatus has a right to access; an archive record for interaction of the user with the interface apparatus; and a cyber portrait of the user including at least one kind of characteristics selected from: cognitive characteristics of the user, behavioral characteristics of the user, physiological characteristics of the user, and mental characteristics of the user.

According to some embodiments of the present invention, the configuration and control system includes a cyber certificate database controller coupled to the cyber certificate database. The configuration and control system is configured for controlling access to the records stored in the cyber certificate database for reading and updating the records.

According to some embodiments of the present invention, the configuration and control system includes a reconfiguration device configured for dynamic reconfiguration of functionality of the interface apparatus. The reconfiguration device is coupled to the cyber certificate database controller. The dynamic reconfiguration of functionality of the interface apparatus includes at least the following operations:

(1) receiving external signals for adjusting the interface apparatus to the operating conditions of the communication network, and adjusting operation of the corresponding external entities to the predetermined requirements imposed on these external entities for cooperation with the interface apparatus; and (2) providing instruction signals to the cyber certificate database controller for reading and updating the database records.

According to another general aspect of the present invention, there is provided a system for interaction of users with a plurality of entities over a communication network. The system includes one or more user interface apparatuses described above, and the plurality of entities.

According to some embodiments of the present invention, the user interface apparatus can interact with an external dialogue system configured for organization and conduction of natural language dialogues with the user. Specifically, the external dialogue system is configured for receiving coded information input signals originating from the front-end communication system. The external dialogue system is also configured for analyzing the received input signals and for generating coded information output signals as a reaction to the coded information input signals. These coded information output signals can be forwarded to the interface apparatus for decoding and outputting to the user.

According to an embodiment of the present invention, the external dialogue system includes a speech recognition system configured for receiving the coded information input signals originating from the front-end communication system and for transforming these signals into data suitable for computer processing.

According to an embodiment of the present invention, the external dialogue system also includes a dialogue manager coupled to the speech recognition system, and configured to process said data and to generate the coded information output signals, which are generated as a reaction to the coded information input signals.

According to one embodiment of the present invention, the coded information input signals include a query signal. In this embodiment, the dialogue system can include a search engine associated with the dialogue manager. The search engine is configured for receiving a processed query signal from the dialogue manager, for conducting a search based on a query related to the query signal and for providing search results to the dialogue manager for targeting thereof to the user. The search results can be included in the coded information output signals.

According to an embodiment, the coded information input signals include user state patterns forwarded by the decision-making system. In this embodiment, the dialogue system is also configured to analyze the user state patterns, and to generate advice of the entity as a reaction to the monitored state of the user. The entity advice can be included in the coded information output signals.

According to some embodiments of the present invention, the user interface apparatus can interact with a supervisor communication support system. The supervisor communication support system is configured for finding a supervisor communication device used by a supervisor of the user and supporting communication of the user interface apparatus with the supervisor communication device. For example, the user of the interface apparatus can be a child, the supervisor can be a parent of the child, and the supervisor communication device can be a communication device of the parent.

According to some embodiments of the present invention, the user interface apparatus can interact with a situation identification system. The situation identification system is configured for receiving coded information input signals originating from the front-end communication system and user state patterns forwarded by the decision-making system, and for carrying out an analysis thereof for identifying various situations occurring with the user and notifying the supervisor communication support system of these situations as they are discovered. For example, the situation identification system can be configured to communicate with a network system providing medical diagnostics service.

According to some embodiments of the present invention, the user interface apparatus can interact with a peer communication support system. The peer communication support system is configured for finding one or more other interface apparatuses used by peers to the user and for supporting communication between the interface apparatus of the user and the other interface apparatuses. For example, the user of the interface apparatus can be a child, and the peer can be another child.

According to some embodiments of the present invention, the user interface apparatus can interact with an entities control system configured for conducting a semantic search and management of the plurality of network entities in order to provide cloud services to the user of the interface apparatus.

According to yet another general aspect of the present invention, there is provided a method for interaction of users with a plurality of network entities over a communication network by using the interface apparatus described above.

According to an embodiment of the present invention, the method includes at the interface apparatus end adjusting the interface apparatus to operating conditions of the network entities providing services in the communication network, and reconfiguring and controlling functionality of the network entities for adjusting operation of the network entities to predetermined requirements imposed on the external entities for cooperation with the interface apparatus.

According to an embodiment of the present invention, the method further includes receiving user input information from the user; processing the user input information and forwarding the corresponding processed signal to one or more network entities. The method also includes receiving coded information output signals from one or more network entities, and processing thereof to obtain user information output signals in a format suitable for outputting to the user.

According to an embodiment, the method further includes collecting user state information related to a state of the user and generating user state patterns indicative of the state of the user. The method further includes receiving user state patterns and processing thereof, and taking a decision as to how to respond to the received user state patterns. The taking of the decision as to how to respond to the received user state patterns includes the following scenarios:

(1) if at least one of the user state patterns matches at least one reference state pattern, taking a decision to generate the coded information output signals indicative of advice as a reaction to the monitored state of the user, and providing coded information output signals for decoding thereof, and providing advice to the user; and (2) if none of the user state patterns matches at least one reference state pattern, forwarding the monitored user state patterns to a corresponding at least one entity configured for handling the user patterns.

According to an embodiment, the processing of the user state patterns includes comparing the user state patterns with reference state patterns stored in the interface apparatus; and taking a decision as to how to respond to the received user state patterns. The reference state patterns can be indicative of various predetermined states of the user and can be used as a reference for determining a monitored state of the user.

According to some embodiments of the present invention, the method comprises at the end of at least one entity: receiving from the interface apparatus the input signals selected from the coded information input signals and the user state patterns; analyzing the input signals, and generating coded information output signals, which are reactions to the coded information input signals; and relaying the coded information output signals to the interface apparatus.

According to some embodiments of the present invention, the method comprises at the end of at least one entity: receiving, from the interface apparatus, input signals selected from said coded information input signals and said user state patterns; providing analysis thereof for identifying various situations occurring with the user; finding a supervisor communication device used by a supervisor of the user; and providing communication of the supervisor communication device with the interface apparatus of the user.

According to some embodiments of the present invention, the method comprises at the end of at least one entity: receiving, from the interface apparatus, coded information input signals; finding one or more other interface apparatuses used by peers to the user, and providing communication between the interface apparatus of the user and the other interface apparatuses.

According to an embodiment, the processing of the user state patterns includes comparing the user state patterns with reference state patterns stored in the interface apparatus; and taking a decision as to how to respond to the received user state patterns. The reference state patterns can be indicative of various predetermined states of the user and can be used as a reference for determining a monitored state of the user.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

LIST OF REFERENCE NUMERALS

Figure 1:
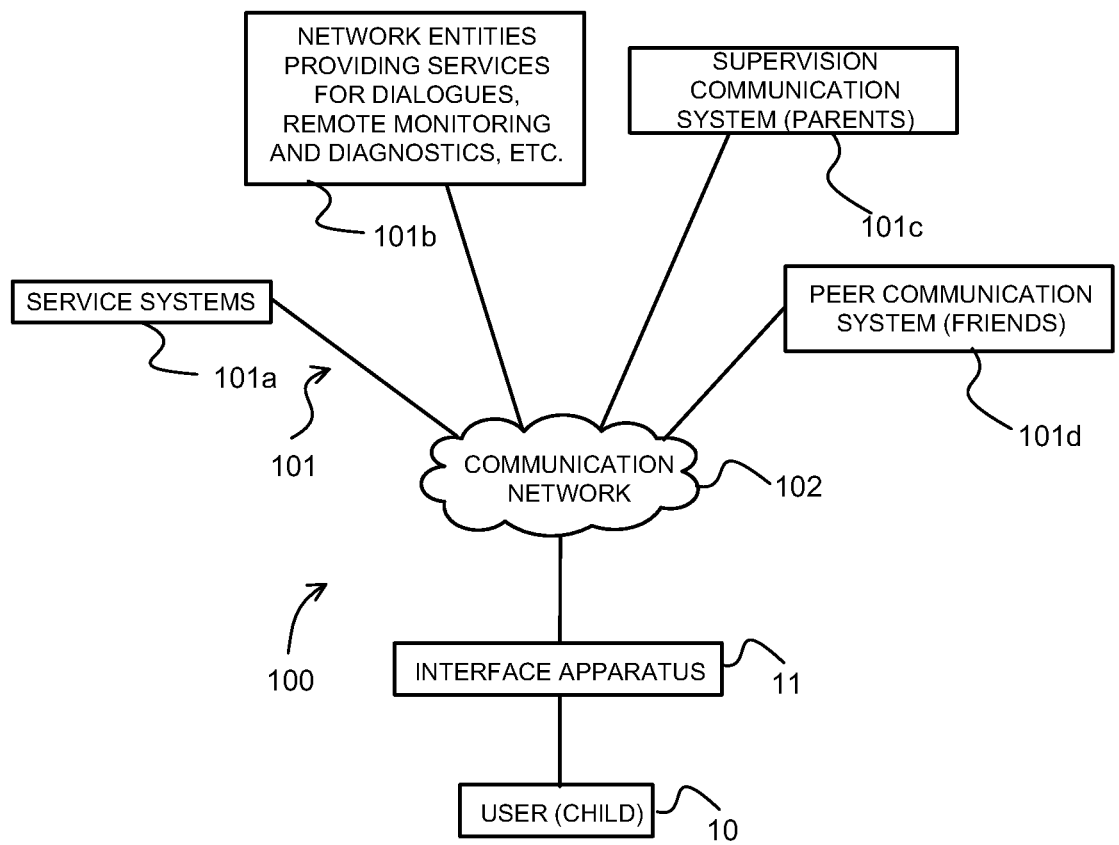
FIG. 1 illustrates a general schematic block diagram of a system for providing interaction of users with a plurality of entities over a communication network, according to an embodiment of the present invention.

10—User
11—Interface apparatus
100—System
101—Network entities
101b—Examples of network entities (Service systems)
101c—Example of network entity (Supervisor communication system)
101d—Example of network entity (Peer communication system)
102—Communication network
105—Tactile sensor 106—Gyroscope
107—View synthesizer (VS)
108—Speech synthesizer (SS)
109—Encoding and decoding (E/D) module
111—Communication processing system (CPS)
112—Front-end communication system (FECS)
113—Front-end monitoring system (NEMS)
114—Decision-making system (DMS)
115—Speaker
116—Video camera
117—Microphone
118—Display
119—Interface for remote monitoring (RMI)
120—Wireless network connector (WNC)
121—User physiological parameter sensor (UPPS)
122—Location sensor (LS)
123—Accelerometer sensor (AS)
124—Sensor data collection device (SDCD)
125—Pattern recognition device (SRD)
126—Pattern storage device (PaSD)
127—Policy storage device (PoSD)
128—Decision maker device (DMD)
129—Configuration and control system (CCS)
130—Cyber certificate database (CCD)
131—Cyber certificate database controller (CCDC)
132—Reconfiguration device (RD)
133—Entities control system (ECS)
140—External dialogue system (EDS)
141—Speech recognition system (SRS)
143—Search engine (SE)
142—Dialogue manager (DM)
144—Supervisor communication support system (SCSS)
145—Supervisor communication devices (SCD)
146—Situation identification system (SIS)
147—Peer communication support system (PCSS)
148—Peer interface apparatuses (OEA)
150—Local dialogue organization device (LDOD)
151—Conversation controller (CC)
152—Conversation database (CD)

DETAILED DESCRIPTION

The principles and operation of the system and method for providing interaction of users with a plurality of entities over a communication network according to the present invention may be better understood with reference to the drawings and the accompanying description, it being understood that these drawings and examples in the description are given for illustrative purposes only and are not meant to be limiting. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

System, device and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The same reference numerals and alphabetic characters will be utilized for identifying those components which are common in the system for providing interaction of users with a plurality of entities over a communication network and its components shown in the drawings throughout the present description of the invention. It should be noted that the blocks in the drawings illustrating various embodiments of the present invention are intended as functional entities only, such that the functional relationships between the entities are shown, rather than any physical connections and/or physical relationships.

Some portions of the detailed descriptions, which follow hereinbelow, are presented in terms of algorithms and/or symbolic representations of operations on data represented as physical quantities within registers and memories of a computer system. An algorithm is here conceived to be a sequence of steps requiring physical manipulations of physical quantities and leading to a desired result. Usually, although not necessarily, these quantities take the form of electrical or magnetic signals capable of being stored, transferred, combined, compared, and otherwise manipulated. In the present description, these signals can be referred to as values, elements, symbols, terms, numbers, or the like.

Referring to FIG. 1, a general schematic block diagram of a system 100 for providing interaction of one or more users 10 with one or more network entities 101 over a communication network 102 is illustrated, according to one embodiment of the present invention. The system includes one or more interface apparatuses 11 configured for providing interaction of the users 10 with the network entities 101 representing an external (i.e., "cloudy") system environment of the interface apparatuses 11. It should be understood that any desired number of the interface apparatuses 11 may be associated with one user 10, although for simplicity of illustration, only one interface apparatus 11 associated with one user 10 (e.g., with a child) is explicitly shown in FIG. 1. For the purpose of the present application, the term "network entity" refers to an external (e.g., "cloudy") source and/or a recipient of data signals from the interactive interface apparatus 11 of the present invention over a communication network 102. The network entities 101 can, generally, represent people, organizations, and services using various communication platforms, computer systems, other interface apparatuses, and other communication systems that can communicate with the interface apparatus 11. For example, as shown in the example shown in FIG. 1, the network entities 101 include various service systems (indicated by a reference numeral 101a) configured for control, configuration, diagnostics and support of the system 100. The network entities 101 also include various service systems 101b configured for organization and conduction of natural language dialogues with the user 10, as well as for providing remote monitoring, diagnostics, etc. The network entities 101 also include a supervisor communication system 101c operated by the user's supervisors, (e.g., by parents), and a peer communication system 101d operated by the user's peers (e.g., by friends).

The network entities 101 of the system 100 can be implemented through any suitable combinations of hardware, software, and/or firmware; and include computing devices communicating with interface apparatus 11 via the communication network 102. Further, as will be described hereinbelow, the network entities 101 may be communicably linked to various requirements databases (not shown), and access data stored in these databases. The network entities 101 may be servers operating on network 102, and may be operated by a common entity (not shown) having a set of requirements or architecture for compliance. It may be appreciated by one skilled in the art that the databases may be directly communicably linked to the network entities 101, or may be communicably linked to the network entities 101 through the network 102. When desired, the network entities 101 may, for example, be implemented as servers that are configured to operate data mining tools, and to permit access to the information stored in the databases. The network entities 101 may, for example, be associated with personal computers, workstations. When desired, one or more network entities 101 may be associated with suitable handheld devices, such as Personal Digital Assistant (PDA) devices, cellular telephones, or any other devices that are capable of operating, either directly or indirectly, on the network 102. The communication network 102 may, for example, be implemented as an external global network, such as the Internet. It may further be appreciated that alternatively, the network 102 may also be implemented as any local or wide area network, either public or private. The communication network 102 can also be a combination of global and local networks.

Although the interface apparatus 11 of the present application is described hereinbelow mainly in application to children and young users, it should be understood that adults can also utilize this apparatus, and thus benefit from the advantages provided by the present invention.

According to an embodiment of the present invention, the interface apparatus 11 can be realized in the form of an interactive children's toy, such as stuffed animals, dolls, toy robots or any other figurines, however other implementations are also contemplated. For example, when desired, the interface apparatus 11 can be implemented in the form of a smart baby carriage or stroller. The interface apparatus 11 can be realized in the form of a baby cot, as well as in the form of a specialized garment for children.

The interface apparatus 11 includes electronic components arranged within the figurine body, and are implemented as a computer system including hardware, software, and/or firmware configured for communication of the user 10 with the network entities 101. In particular, the hardware (not shown) is configured as a system including such main component as a central processing unit (CPU), a main memory (RAM), a read only memory (ROM), an external memory, etc. The processor is preprogrammed by a suitable software model capable of analyzing the user input information from the user and the user state information related to a state of the user and relaying this information to the external network entities 101. The software model is also configured for providing user information output signals to the interface apparatus from the external network entities 101 as a reaction to the user input information. The software can be stored in the ROM, a rewritable persistent storage device like a hard disk, a solid state memory device like a flash memory, an external memory device or the like, and when required can be loaded into the RAM, and executed by the processor. Accordingly, the processor can perform a number of data processing steps, calculations, or estimating functions, some of which will be discussed hereinbelow. It should also be understood that the present invention further contemplates a machine-readable memory tangibly embodying a program of instructions executable by the machine for executing the method of the invention.

Figure 2:
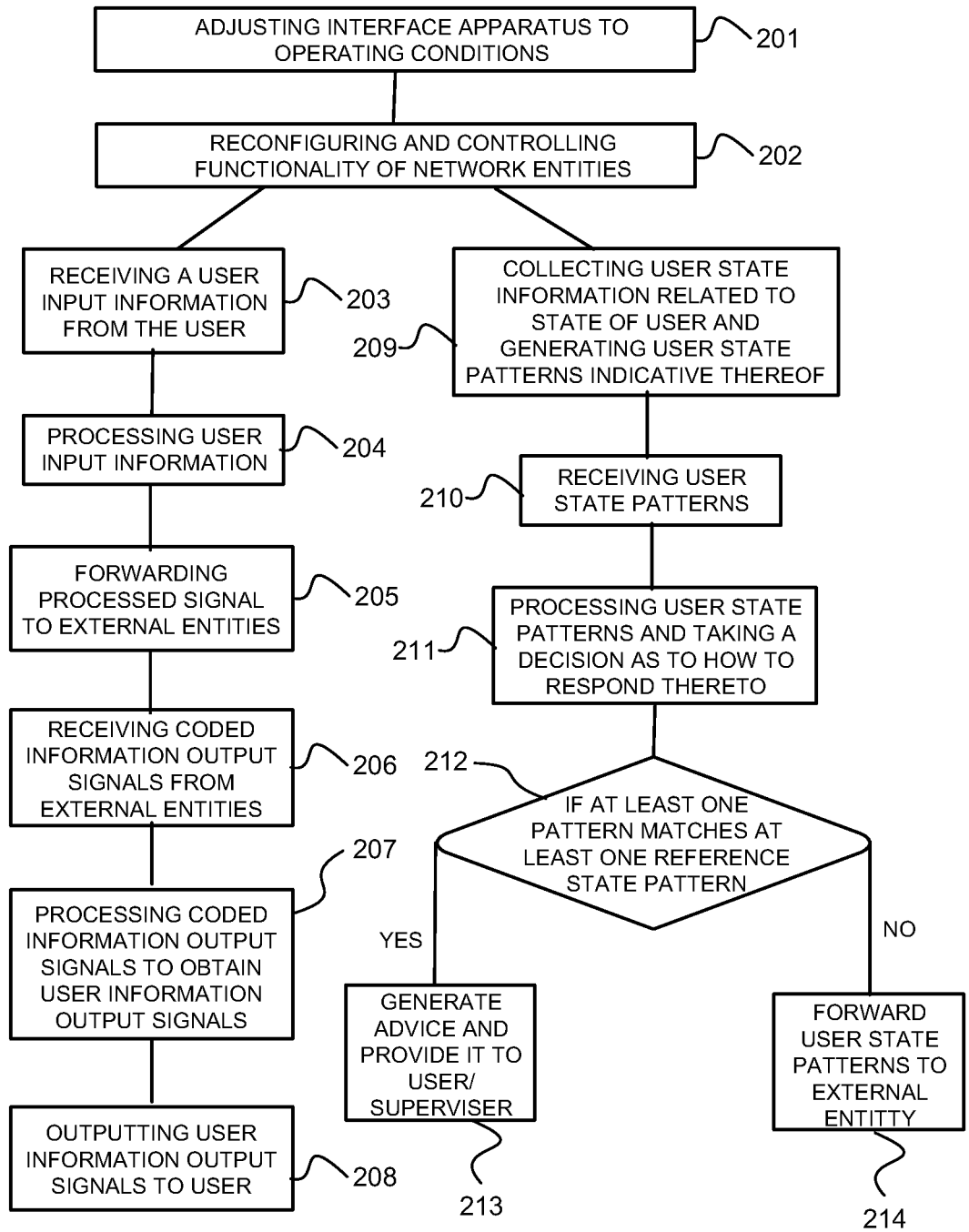
FIG. 2 illustrates a schematic flowchart diagram of a method for providing interaction of users with a plurality of network entities over a communication network by the interface apparatus of FIG. 1 configured to provide the interaction between a user and a plurality of network entities cooperating with said interface apparatus under a predetermined service agreement, in accordance with an embodiment of the present invention.

FIG. 2 illustrates a schematic flowchart diagram of a method for providing interaction of users with a plurality of network entities 101 over a communication network 102 by the interface apparatus 11 configured to provide interaction between a user and a plurality of network entities cooperating with said interface apparatus under a predetermined agreement, in accordance with an embodiment of the present invention. The predetermined service agreement can, for example, be established between a customer (e.g., an owner or user of the interface apparatus 11) and a provider of certain cloud services associated with the network entities 101.

Referring to FIGS. 1 and 2 together, the method includes adjusting (block 201) the interface apparatus 11 to operating conditions in the communication network 102 in accordance with the predetermined service agreement, and reconfiguring and controlling functionality (block 202) of the network entities 101 for adjusting operation of the network entities to predetermined requirements imposed on the external entities for interaction with the interface apparatus. In particular, the network entities 101 can generally have extended functionality, and be capable to provide some features which are not required to the user. Accordingly, the interaction of the interface apparatus 11 with these entities can be adjusted by selecting only those functions of the network entities 101 which are assigned to the user in the agreement.

According to one embodiment of the present invention, the method also includes (see block 203) receiving user input information from the user, processing (see block 204) this user input information and forwarding (see block 205) the corresponding processed signal to one or more external entities 101 configured for handling communication with the user and generating coded information output signals.

The method further includes receiving (see block 206) coded information output signals from the external entities 101, and processing (see block 207) thereof to obtain user information output signals in a format suitable for outputting (see block 208) to the user through a speaker and/or display that can be provided with the interface apparatus.

According to another embodiment of the present invention, the method includes collecting (block 209) user state information related to a state of the user and generating user state patterns indicative of the state of the user. Then, the method further includes receiving (block 210) the user state patterns, processing (block 211) thereof by comparing the user state patterns with reference state patterns stored in the interface apparatus and taking a decision as to how to respond to the received user state patterns. The reference state patterns are indicative of various predetermined states of the user and can be used as a reference for determining a monitored state of the user.

According to one embodiment of the present invention, if at least one of the user state patterns matches (block 212) at least one reference state pattern stored in the interface apparatus, the decision is to generate (block 213) the coded information output signals that includes advice indicative of reaction on the monitored state of the user 10 and to process the coded information output signals for decoding thereof in order to extract the advice, and to output the advice to the user 10.

According to another embodiment, if at least one of the user state patterns matches a certain predetermined reference state pattern stored in the interface apparatus, the decision can be to send a notice to one or more external entities (e.g., to the parents) with information on the fact of revealing this pattern.

According to one embodiment of the present invention, if none of the user state patterns matches at least one reference state pattern, the monitored user state patterns are forwarded (block 214) to a corresponding at least one external entity 101 configured for handling the user patterns.

According to some embodiments, one or more external entities 101 can be configured for receiving coded information input signals from the interface apparatus 11, analyzing the coded information input signals and generating the coded information output signals indicative of reaction on the coded information input signals, and relaying the coded information output signals to the interface apparatus.

According to some embodiments, one or more external entities 101 can be configured for receiving user state patterns from the interface apparatus 11, analyzing the user state patterns and generating said coded information output signals indicative of reaction on said coded information input signals, and relaying the coded information output signals to the interface apparatus 11.

According to some embodiments, one or more external entities 101 can be configured for receiving from the interface apparatus 11 coded information input signals, providing analysis thereof for identifying various situations occurring with the user 10, finding a communication device of a supervisor (e.g., a parent) of the child user, and providing communication of the supervisor communication device with the interface apparatus 11 of the user 10.

According to some embodiments, one or more external entities 101 can be configured for receiving user state patterns from the interface apparatus 11, providing analysis thereof for identifying various situations occurring with the user, finding a communication device of a supervisor (e.g., a parent) of the child user, and providing communication of the supervisor communication device with the interface apparatus of the user 10.

According to some embodiments, one or more external entities 101 can be configured for receiving coded information input signals from the interface apparatus, finding an interface apparatus used by a peer (e.g. a friend) to the user, and providing communication between the interface apparatus of the user and said at least one another interface apparatus.

Figure 3:
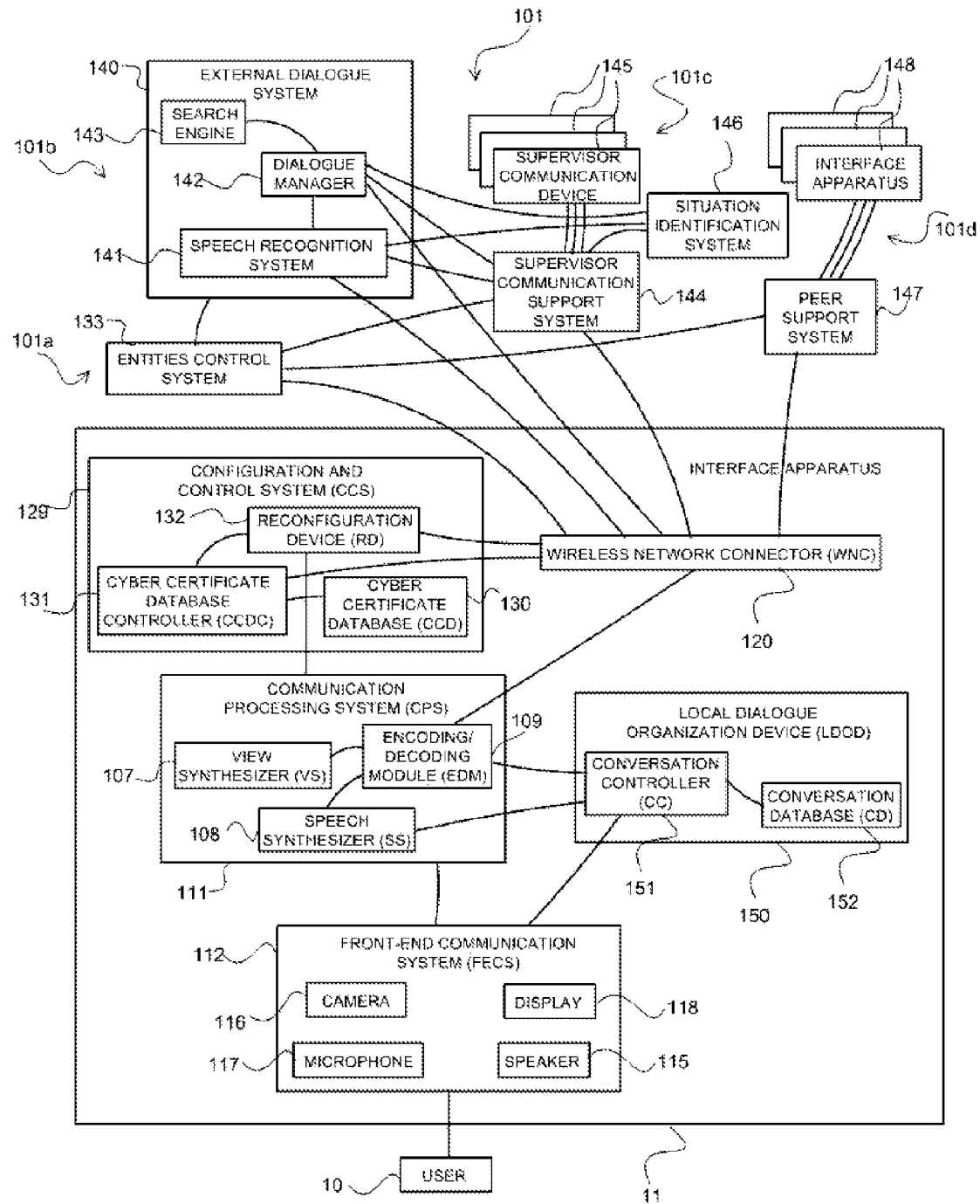
FIG. 3 illustrates a more detailed schematic block diagram of the system of FIG. 1 configured for providing interaction of users with a plurality of entities over a communication network, according to one embodiment of the present invention.

Referring to FIG. 3, a more detailed schematic block diagram of the system (100 in FIG. 1) for providing interaction of users with a plurality of network entities 101 over a communication network is illustrated, according to an embodiment of the present invention. According to this embodiment, the interface apparatus 11 includes a communication section including a front-end communication system 112 having a set of devices for audio and visual interaction of the apparatus 11 with the user 10, a communication processing system 111 coupled to the front-end communication system 112, a configuration and control system 129, and a wireless network connector 120 electrically coupled to the configuration and control system 129 and to the communication processing system 111.

The term "front-end" is used in the present application to characterize devices, program interfaces and/or services relative to the initial user 10 of these devices. According to this definition, all the devices program interfaces and/or services employed in the network entities 101 are referred to as "back-end" devices.

According to an embodiment, the wireless network connector 120 is configured for providing a wireless signal linkage between the interface apparatus 11 and the plurality of network entities 101 over the communication network 102. The wireless network connector 120 can be any suitable device implemented through any suitable combinations of hardware, software, and/or firmware.

According to an embodiment of the present invention, the front-end communication system 112 includes one or more front-end communication input devices (CID) configured for interaction with the user 10 for receiving user input information from the user, and generating user information input signals. The front-end communication system 112 can also include one or more front-end communication output devices (COD) configured for interaction with the user 10 for audio outputting and/or video outputting user information output signals obtained as a reaction to the user input information. The user information output signals can, for example, originate from the decision-making system 114, as will be described hereinbelow in detail. Likewise, the user information output signals can be targeted to the user from the corresponding network entities 101 through the communication network 102.

According to an embodiment, the front-end communication system 112 includes such a front-end communication input device (CID) as a microphone 117 configured for receiving the user input information provided verbally (i.e., a user utterance), and converting the user information into the user information input signals corresponding to the user verbal input information. When desired, the front-end communication system 112 can also include such a front-end communication input device (CID) as a video camera 116 configured for receiving the user information provided visually (i.e., a user image) and converting the user information into the user information input signals corresponding to the visual user information.

According to an embodiment, the front-end communication system 112 includes such a communication output device (COD) as a speaker 115 configured for audio outputting the user information output signals. Moreover, when desired, the front-end communication system 112 can include such a communication output device (COD) as a display 118 configured for video outputting the user information output signals. The user information output signals can, for example, be indicative of reaction of the decision-making system 114 or the corresponding network entities 101 to the user information input signals.

When the interface apparatus 11 is implemented in the form of an interactive stuffed animal or a doll, the microphone 117 may, for example, be disposed in the toy's ears, the video camera 116 may, for example, be disposed in the eyes of the toy's face, the display 118 may, for example, be disposed on the body of the toy, and the speaker 115 may, for example, be disposed in the toy's mouth.

When desired, the communication output device (COD) may also include any other presentation devices configured for interaction with the user 10 to provide output information to the user in a sensual and visual manner, mutatis mutandis. Exemplary presentation devices include, but are not limited to, vibrating components, light emitting elements, motion providing elements associated with suitable motors configured for providing motion to various body parts of the interactive toy, etc.

According to an embodiment, the communication processing system 111 includes an encoding and decoding module 109 coupled to the front-end communication input devices (CID) and to the front-end communication output devices (COD).

The encoding and decoding module 109 is configured for receiving the user information input signals, such as audio and video signals generated by the microphone 117 and by the video camera 116, correspondingly, for coding these signals to a format suitable for data transfer, and for relaying coded information input signals to the wireless network connector 120 for forwarding the coded information input signals to one or more network entities 101 configured for handling communication with the user over the communication network.

The encoding and decoding module 109 can be implemented through any suitable combinations of hardware, software, and/or firmware. A digital data stream at the output of the encoding and decoding module 109 may be encoded using any of the existing audio and video coding standards. For example, the data stream can be encoded using the following standards: MPEG-4 Visual codec, h. 264, VP8, etc for video signal provided by the built-in video camera 116, and MP3, AAC, Vorbis, etc. to encode the audio signal provided by the microphone 117.

According to an embodiment, the communication processing system 111 is also configured for receiving coded information output signals provided by network entities 101 through the wireless network connector 120 by the encoding and decoding module 109, and for decoding these signals to obtain the user information output signals in a format suitable for outputting by the corresponding communication output devices.

According to an embodiment, the communication processing system 111 includes a speech synthesizer 108 coupled to the encoding and decoding module 109 and to the speaker 115. The speech synthesizer 108 is configured to receive decoded information output signals, and to generate electrical signals in a format suitable for audio outputting thereof by the speaker 115. Likewise, when desired, the electrical signals generated by the speech synthesizer 108 can be encoded by the encoding and decoding module 109 and transmitted to the corresponding network entities 101 through the communication network 102.

The decoded signals that are fed to the speech synthesizer 108 can generally be presented in different formats, for example, it can be a string of text that should be audio outputted by the speaker 115. According to another example, the decoded signals can be a data structure represented in structured data representation language, such as XML or JSON.

The user information output signals can, for example, be received by the encoding and decoding module 109 in a coded form from the corresponding entities 101 through the communication network 102. Moreover, as will be described hereinbelow, the user information output signals can be generated by the corresponding module included in the interface apparatus 11.

According to a further embodiment, the communication processing system 111 includes a view synthesizer 107 coupled to the encoding and decoding module 109 and to the display 118. The view synthesizer 107 is configured to receive the decoded signals from the encoding and decoding module 109 and to generate electrical signals in a format suitable for video outputting thereof by the display 118.

For example, the speech synthesizer 108 and the view synthesizer 107 can be conventional systems implemented in hardware and included in a customized microchip. Alternatively, the speech synthesizer 108 and the view synthesizer 107 can be realized as hardware and software integrated solutions that represent a set of algorithms for speech and image synthesis, and a hardware computing platform to run the algorithm data and convert the results into electrical audio and video signals which are relayed to the speaker 115 and to the display 118, correspondingly.

According to an embodiment of the present invention, a local dialogue organization device 150 is included in the interface apparatus 11 for providing a dialogue between the user 10 and the interface apparatus 11. The local dialogue organization device 150 can be coupled to the speech synthesizer 108 of the communication processing system 111 and to the speaker 115 of the front-end communication system 112. The local dialogue organization device 150 generally includes a conversation controller 151 coupled to the speech synthesizer 108, and a conversation database 152 coupled to the conversation controller 151 information output signals. The conversation controller 151 is configured for receiving a user utterance from the microphone 117 in the form of a user information input signal, analyzing the user information input signal, retrieving an information output signal including an answer that corresponds to the user utterance sentence from the conversation database information output signals 152, relaying the information output signal to the speech synthesizer 108 and outputting this answer to the user via the speaker 115. Construction and operation of speech recognition and conversation techniques are generally known in the art (see, for example, U.S. Pat. No. 7,016,8849; U.S. Pat. No. 7,177,817; U.S. Pat. No. 7,415,406; U.S. Pat. No. 7,805,312; U.S. Pat. No. 7,949,532; the description of which is hereby incorporated in its entirety by reference); and therefore will not be expounded hereinbelow in detail.

It should be noted that the local dialogue organization device 150 can, for example, be used in the case when relatively simple dialogues between the user and the interface apparatus are conducted, and when no access to the communication network 102 is available. If the questions are sophisticated and require special knowledge that is not included in the database 152 of the local dialogue organization device 150, the interface apparatus 11 can address this question to the corresponding external network entity for handling this request, as will be described hereinbelow in detail.

Figure 4:
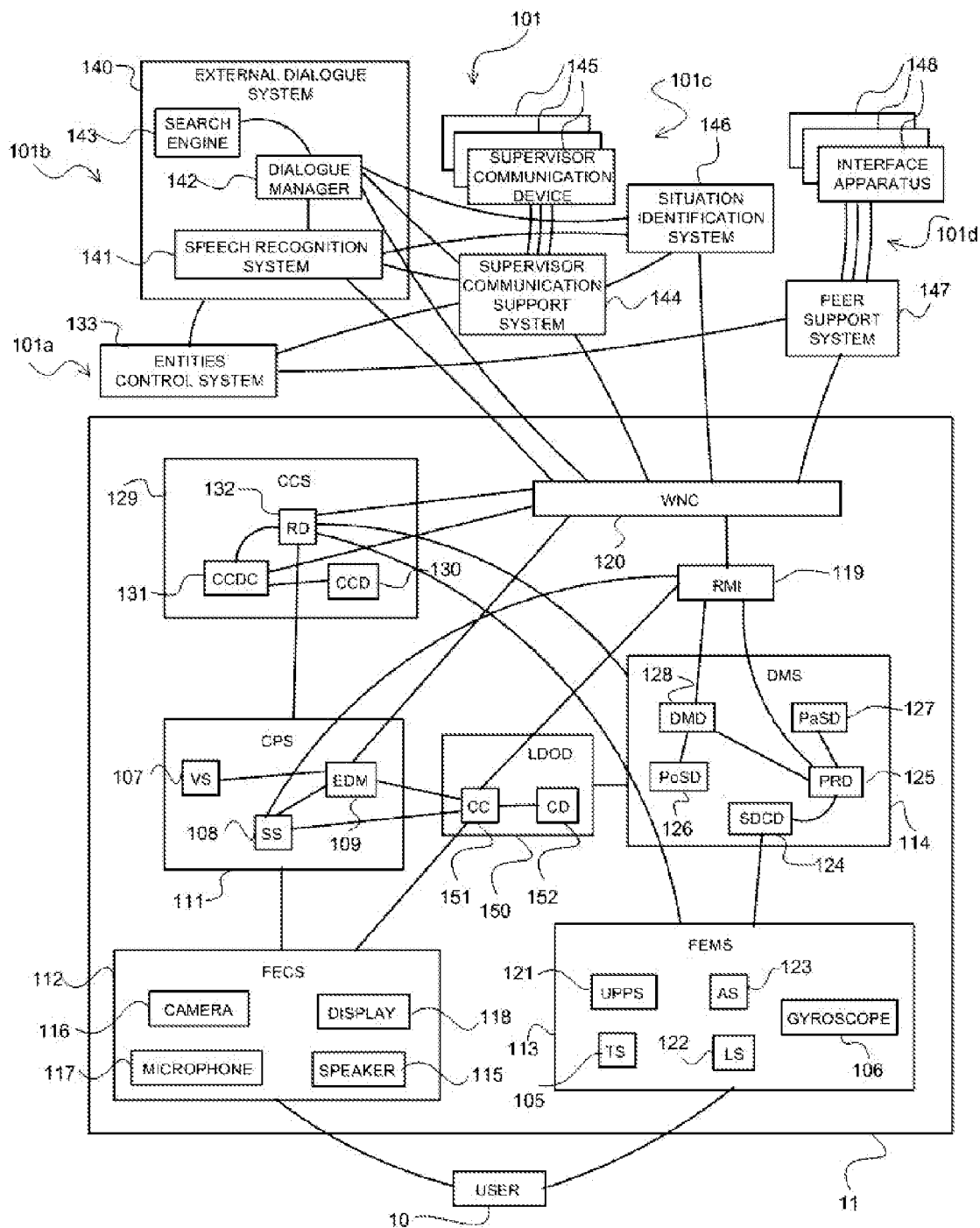
FIG. 4 illustrates a more detailed schematic block diagram of the system of FIG. 1 configured for providing interaction of users with a plurality of entities over a communication network, according to another embodiment of the present invention.

Referring to FIG. 4, a schematic block diagram of the system for providing interaction of users with a plurality of network entities 101 over a communication network is illustrated, according to another embodiment of the present invention. According to this embodiment, the interface apparatus 11 differs from the interface apparatus shown in FIG. 3 due to the fact that the interface apparatus shown in FIG. 4 further includes a monitoring section in addition to the communication section. The monitoring section includes a front-end monitoring system 113 having a set of devices for monitoring vital signs of the user 10, a decision-making system 114 coupled to the device monitoring system 113, and an interface for remote monitoring (RMI) 119 coupled to the decision-making system 114. The interface for remote monitoring (RMI) 119 is also coupled to the wireless network connector 120, to the communication processing system 111, and to the local dialogue organization device 150.

According to an embodiment of the present invention, the front-end monitoring system 113 of the interface apparatus 11 includes one or more front-end monitoring devices (MD) configured for interacting with the user 10 in order to collect user's characteristics. The user's characteristics can, for example, include user state information related to a state, location and current activity of the user 10. The front-end monitoring devices are also configured for generating user state patterns, which are data signals indicative of the user's characteristics, and variations of these data signals. For example, the monitoring devices MDs include various types of sensors to gather information about such user's parameters as a current state of the child, location, the current activity of the child and his or her interactions with a smart interface 11, etc. When the interface apparatus 11 is implemented in the form of an interactive stuffed animal or a doll, the front-end monitoring devices may, for example, be disposed at the limbs with arms and legs to imitate animal and humanoid touching.

According to an embodiment, the front-end monitoring system 113 includes a tactile sensor 105 configured to provide the user state information which is indicative of a force applied by the user 10 to the interface apparatus in the place where the tactile sensor 105 is located. The sensor signals provided by the tactile sensor 105 can, for example, be used in the interface apparatus 11 in conjunction with signals from other sensors in order to detect the patterns of different situations. In particular, when the interface apparatus is configured for a child user, the sensor signals provided by the tactile sensor 105 can be used in order to detect the patterns of gaming situations, for example, when the child catches a toy interface apparatus that falls to the floor.

The tactile sensor 105 can, for example, be based on different physical principles, such as piezoresistive, piezoelectric, capacitive, resistive, etc. It should be understood that when required, tactile sensor 105 can include several tactile sensor probes located physically in different parts of the apparatus.

According to an embodiment, the front-end monitoring system 113 includes one or more user physiological parameter sensors 121 configured for measuring at least one vital sign of the user 10. Examples of the user physiological parameter sensors 121 include, but are not limited to, a temperature sensor (not shown), a pulse rate sensor (not shown), a blood pressure sensor (not shown), a pulse oximetry sensor (not shown), and a plethysmography sensor (not shown), etc. It should be understood that front-end monitoring system 113 may also include any other suitable monitoring devices related to characteristics of the user. Examples of the vital signs of the user 10 which can be monitored by the front-end monitoring system 113 include, but are not limited to, temperature, heart rate, heart rate variability, arterial pulse waveform, systolic blood pressure, diastolic blood pressure, mean arterial blood pressure, pulse pressure, breathing rate, blood oxygen saturation, total hemoglobin content and/or anaerobic threshold monitoring, etc.

According to an embodiment, the front-end monitoring system 113 includes a user location sensor 122 configured for determination of a location of the interface apparatus 11. Examples of the user location sensor 122 include, but are not limited to, a GPS-based positioning system (i.e., GPS receiver), and various other global positioning systems, such as Russian Global Navigation Satellite System (GLONASS), Indian Regional Navigational Satellite System (IRNSS), European Global Navigation Satellite System (Galileo), Chinese Global Navigation Satellite System (COMPASS), Ekahau Real Time Location System (RTLS), etc. Likewise, a user location sensor 122 can use signals of a cellular network, Wi-Fi, or any other suitable network. Likewise, the location sensor 122 can also be implemented as an inertial positioning system, which includes accelerometers and/or gyroscopes, and/or electronic compasses controlled by a dedicated software algorithm configured to continuously calculate the current position of the interface apparatus, its current movement direction and the current velocity.

According to an embodiment, the front-end monitoring system 113 includes an accelerometer sensor 123 configured for converting the change in velocity (acceleration) of the interface apparatus into an electrical signal in order to detect the variation of motion of the interface apparatus 11.

According to an embodiment, the front-end monitoring system 113 includes a gyroscope 106 producing an electrical signal, which characterizes the changes of orientation of the interface apparatus 11 in space.

The use of the accelerometer 123 together with the gyroscope 106 and the location sensor 122 enables obtaining of the patterns corresponding to motor activity of the user (when, for example, when a child user is playing with the toy interface apparatus) and also recognizing various situations related to the user (for example, the child is sitting, running, falling down, etc).

According to an embodiment of the present invention, the decision-making system 114 is coupled to the front-end monitoring system 113 and is configured for receiving the user state patterns collected by the front-end monitoring devices MDs, and processing these patterns for taking a decision as to how to respond to the received user state patterns.

According to an embodiment, the decision-making system 114 includes a sensor data collection device 124 configured for receiving the user state patterns measured by the front-end monitoring system 113 and formatting these signals for further processing. The decision-making system 114 also includes a pattern recognition device 125 coupled to the sensor data collection device 124, a pattern storage device 126 coupled to the pattern recognition device 125, a decision maker device 128 coupled to the pattern recognition device 125, and a policy storage device 127 coupled to the decision maker device 128. The policy storage device 127 includes a policy decision database (not shown) storing the policies for taking decisions responsive to the patterns received from the front-end monitoring devices MDs.

According to one embodiment of the present invention, the sensor data collection device 124 in operation collects data from the front-end monitoring devices MDs through their periodic survey (polling) in accordance with a predetermined time schedule. In this embodiment, the sensor data collection device 124 may include a Scheduler module (not shown) that can, for example, be a software component which regulates the time schedule of the periodic survey of all the front-end monitoring devices MDs with a purpose to update the collected data. The sensor data collection device 124 may further include an Aggregation and Data Formatting module (not shown) that can, for example, be a software component that carries out integration (aggregation) of the data collected from the front-end monitoring devices MDs and prepares these data by corresponding formatting for the pattern recognition device 125. The sensor data collection device 124 may also include a Polling module (not shown) that can, for example, be a software component that carries out the periodic survey of the front-end monitoring devices MDs according to the schedule established by the Scheduler module, and relays the resulting data to the Aggregation and Data Formatting module for further processing.

According to another embodiment of the present invention, the collection of data from the front-end monitoring devices MDs is based on so-called interruptions. According to this embodiment, the sensor data collection device 124 includes an Interruption module (not shown) that can, for example, be a software component that provides interruptions of the signals relayed to sensor data collection device 124 from the front-end monitoring devices MDs. In operation, as soon as the changes in measuring parameters are registered by one or more front-end monitoring devices MDs, system interruptions are generated in which the control is transferred to the Aggregation and Data Formatting module. Thus, the Aggregation and Data Formatting module receives data from all the front-end monitoring devices MDs, as they become available. As mentioned above, the Aggregation and Data Formatting module provides aggregation of the data collected from front-end monitoring devices MDs and preparing (formatting) these data for the pattern recognition device 125. The data at the output of the sensor data collection device 124 can, for example, be presented in a tree structure, which is expressed by known structured data representation languages, such as XML, JSON, etc.

The pattern recognition device 125 is configured for collating the user state patterns with reference state patterns stored in the interface apparatus, and generating an identification signal indicative of whether at least one of the user state patterns matches or does not match at least one reference state pattern. In this case, the reference state patterns are indicative of various predetermined states of the user, and are used as a reference for determining a monitored state of the user. The pattern recognition device 125 provides analysis of the data received from the front-end monitoring devices MDs. The analysis is carried out within the smart interface apparatus 11 itself, i.e., without a requirement for additional analytical cloud services available through the Internet.

The data analysis is carried out for the purpose of recognition and identification of various situations occurring during the user's interactions with the interface apparatus 11. Detection and identification of the various situations is carried out by collating the user state patterns with the reference patterns which are known in advance and stored in the pattern storage device 126. The pattern storage device 126 includes a reference pattern database (not shown) of the reference patterns corresponding to the various situations associated with the user in which these patterns may appear. Identification of the patterns is carried out by matching the measured pattern (including the pattern measured in a historical perspective) provided in a flow to the pattern recognition device 125 through the sensor data collection device 124, to the reference patterns provided to the pattern recognition device 125 from the pattern storage device 126.

According to an embodiment, the database of the reference patterns can include a file (or a set of files) in the file system, describing the patterns in a particular format.

According to another embodiment, the database of the reference patterns can include a subsystem based on existing relational database management systems (RDBMS), such as Oracle (e.g., Oracle Express Edition), MySQL, SQLite, PostgreSQL, Informix, etc.

According to a further embodiment, the reference pattern database may be based on object-oriented databases and graph databases based on network organization of data objects as graphs with complex structures that have Small-World properties, known per se.

The reference patterns may have a different internal structure and can be presented in different formats, depending on how the patterns are stored. For example, in the case when the patterns are stored either in the form of graph databases or in the form of simple files in the file system, the patterns can be data objects which have tree-like internal structure and which are implemented, inter alia, by means of XML, JSON, and some other languages.

The measured user state patterns reflect variations of one or several characteristics of a user. For example, the pattern may reflect deviation of the temperature of the user's body from the normal temperature that can be captured by a temperature sensor that is included in the set of physiological parameter sensors 121. In particular, the increase of the body temperature above a certain temperature threshold (e.g., +37° C.), may be interpreted as suspicion for the presence of a particular sickness of the child, e.g. a cold or inflammation in the child's body.

Another example of the measured user state patterns is a pattern received by the location sensor 122. This pattern may be the deviation of the coordinates of the current location of the child from a certain place. Likewise, the pattern may be the deviation of the user's coordinates from a specified route (for example, the route from home to school and back) or deflection of the user's coordinates from the coordinates of the specified area (for example, from the coordinates of the playground that is next to the house of the child).

When desired, more complicated situations can be detected and identified by monitoring various complex patterns that may be received concurrently from several sensors.

According to an embodiment, the measured user state patterns can be associated with certain situations that can occur during interactions of the user with the interface apparatus. These situations can, for example, be described as data objects that refer to the patterns corresponding to these situations. Several patterns can correspond to the certain situation, which can be present concurrently or as a chain of events.

An example of how several interconnected patterns lead to the discovery of a certain situation may be illustrated on a procedure for detection of variations in the emotional state of the child. The interface device can for example, identify and register the situation, indicating the presence of a bad temper in the child, such as aggression, depression, crying, etc. The identification can be carried out by the identification of the relevant data patterns based on the analysis of the nature of the dialogue with the child, for example, use of aggressive words in the dialogue, interruption of the conversation, etc. Moreover, the identification can use the analysis of the emotional character of the child's speech, since the pace and intonation of the speech can indicate aggression, depression, etc. Likewise, an analysis of the video image of the child taken with the built-in video camera can be used for the identification of the emotional state of the child. In this case, the identification may be based on the analysis of the pupils of the child's eyes, his facial expression, gestures and body movements during the detection, etc.

When desired, a model with more complex interrelated situations can be built. For example, when the detected patterns indicate the presence of the child's bad mood (irritability, depression, etc.) and this type of the child's behavior differs from his regular behavior for similar time periods in the past (for example, a child today cries and gets irritated more than usual in the past), there is a suspicion of the existence of variations in the state of the child's health. If there is suspicion of the existence of variations in the health state of the child, the interface apparatus can initiate measurements of the child's physiological parameters, for example, his body temperature, and if this temperature is not normal, the interface makes conclusions that the child is sick and takes appropriate actions. Thus, the patterns indicating a bad mood of the child can be linked with patterns indicating his health changes.

The patterns and the interaction between them can be described as a data object that can contain its unique identifier that allows distinguishing of a certain situation from many others. Such a unique identifier is an attribute of data, and can be presented in different formats, for example, it can be an arbitrary string of text containing a unique set of characters. Likewise, the unique identifier can be a number, or a globally-unique identifier (Globally Unique ID or GUID), etc.

Forming and updating the database of reference patterns of the pattern storage device 126 can be carried out in a number of ways. For example, a description of the situations and the reference patterns associated with these situations can be transmitted to the database of the reference patterns from those network entities 101 which are dedicated for this purpose. The transmission can be carried out via the Internet, then via the wireless network connector 120, then via the interface for remote monitoring 119 and also via the pattern recognition device 125. In this case, updates of the reference patterns in the database can be handled by the configuration and control system 129, as will be described hereinbelow.

According to another example, the updating of the reference patterns in the database of the pattern storage device 126 can be carried out by teaching the interface apparatus by the user of this apparatus. In particular, in the case of occurrence of a certain situation, the user (i.e., the child or a parent of the child) indicates occurrence of this situation, provides an identification name to this situation, and requests the interface apparatus, (e.g., a child's toy) to memorize this situation by storing the corresponding pattern in the database of the pattern storage device 126. All the interactions with the interface apparatus can be conducted in the form of a dialogue in a natural language.

After receiving an instruction from the user to store a pattern, the interface apparatus 11 defines the situation, records the changes for all the parameters of the sensors at the time when this situation occurred, automatically generates a description of the corresponding pattern, associates the corresponding situation with this pattern, and adds the pattern with the corresponding description into the database of the pattern storage device 126.

In operation, if the pattern recognition device 125 identifies a correlation between the user state patterns and at least one reference pattern corresponding to a certain situation related to the user, an identification signal is generated indicative of the corresponding situation that is associated with the given pattern. This identification signal is then relayed to the decision maker device 128 for taking a decision in accordance with a predetermined policy associated with this situation.

Alternatively, if none of the user state patterns matches at least one reference state pattern stored in the database of the pattern storage device 126, the pattern recognition device 125 can forward these monitored user state patterns via the interface for remote monitoring 119 to the corresponding network entity that is configured for handling such user patterns.

It should be understood that various known algorithms can be used for analysis of the pattern data received from the sensor data collection device 124 for identification of correlations of the patterns obtained from the user with the reference patterns. In particular, such algorithms can take into account the statistical characteristics of the data, and to analyze the data in their historical (chronological) perspective and consider how these data were changed at certain time periods in the past.

Moreover, various search algorithms based on a fuzzy logic can be used. Such algorithms conduct a fuzzy match with the specified pattern with a certain degree of proximity to the reference pattern. This provision enables identification of the user patterns despite all kind of obstacles, such as fluctuations of data, errors in measurement, noise, etc.

The decision maker device 128 is configured for receiving an identification signal from the pattern recognition device 125, and in response to the identification signal, searching a suitable policy in the policy decisions database of the policy storage device 127 for taking the corresponding decision responsive to the received patterns. The policy includes instructions for taking the suitable decision as to how to respond to the measured user state pattern.

According to an embodiment of the present invention, the decision maker device 128 is also configured for relaying instructions indicative of the suitable policy either to the local dialogue organization device 150 for organizing a dialogue between the user and the interface apparatus or to the network entities 101 cooperating with the interface apparatus for handling thereof.

As described above, the local dialogue organization device 150 can be configured for organization of a dialogue between the user 10 and the interface apparatus 11 when the decision maker device 128 sends corresponding information output signals to the communication processing system 111 to employ a voice dialogue with the user for outputting suitable advice to the user which would be responsive to the measured user state pattern.

Thus, the policy decision database of the policy storage device 127 includes a set of decisions, the corresponding advice and instructions in connection with the actions that should be carried out in the case of detection and identification of a certain situation related to the corresponding pattern(s) received from the front-end monitoring devices of the front-end monitoring system 113. The set of decisions, for example, may include a decision to communicate with a child's parent and to send to the parent a notice and/or alert of the occurrence of certain situations. The alert may include information that the child left the territory of a certain playground and provide data on the child's current location. Likewise, the alert may include information associated with the track of a child's movements, such as the child fell down from a certain height (e.g., a bed, a table, etc). Moreover, the notice/alert may include information about the physiological and emotional state of the child, such as a crying, fever, etc.

When required, in the case of critical situations that represent a threat to the life and health of the child, the set of decisions may include the decisions to place a corresponding call automatically to an emergency rescue service (with a simultaneous notification to the parents of critical situations).

When required, the set of decisions may include a decision to generate and send the corresponding user information output signals to the communication processing system 111 of the interface apparatus to perform certain actions. For example, when the front-end monitoring system 113 provides signals indicative of depressed or dissatisfied emotional states of the user (e.g., the child is crying), the decision maker device 128 may send corresponding information output signals to the communication processing system 111 to employ a voice dialogue with the child, which may be conducted in a specific form with certain specified words in replicas for soothing the child providing the text of the dialogue. When desired, the dialogue may be provided with a suitable intonation and a voice timbre. An example of the system capable of changing voice patterns according to a user's status and is suitable for the purpose of the present application is described in U.S. Pat. No. 8,123,615, the description of which is hereby incorporated in its entirety by reference.

Further, the set of decisions may include a decision to send instructions to one or more network entities that cooperate with the interface apparatus to provide suitable cloud services to the user. The instructions may, for example, include commands for automatic reconfiguration and control of the functionality of the network entities so as to adjust their operation to cooperate with the interface apparatus for a desired interaction with the child. For example, as will be described hereinbelow in detail, the decision maker device 128 can control a corresponding network entity responsible for conducting dialogues with the user, that upon receiving the notification that the child is crying, can be adjusted on the fly to generate replicas for soothing the child in addition to that replicas which are generated by the interface apparatus itself, by adapting not only the text of the dialogue, but also a voice timbre, intonation and pace of the delivered speech, etc.

According to an embodiment of the present invention, when the interface apparatus is implemented in the form a children's toy, the front-end communication system may include light devices disposed on the body of the toy, motors associated with limbs of the toy, and also other devices that may indicate reaction of the toy on the user state patterns indicative of the emotional and physiological states of the user. Thus responsive to the user state patterns, the decision maker device 128 of the interactive toy interface apparatus may be configured for activation of one or several such devices in order to wink an eye, light a built-in light device, smile, lend an arm (or paw), change color, etc.

It should be understood that the policy storage device 127 and the pattern storage device 126 can be physically realized as two different storage devices. However, when desired, the policy decision database and the reference pattern database can share a common storage device integrating the policy storage device 127 and the pattern storage device 126 together, and be managed by a common database management system (not shown). The policy decisions may, for example, be represented by data objects having tree-like internal structure or other suitable internal structure similar to the database of the reference patterns.

As described above, the interface for remote monitoring 119 of the interface apparatus 11 is coupled to the communication processing system 111 of the communication section and to the decision-making system 114 of the monitoring section. According to this embodiment, the interface for remote monitoring 119 can provide interaction of the communication, monitoring and decision-making components of the interface apparatus 11 with the plurality of network entities 101 that provide cloud-based services through the communication network 102, e.g., through the Internet, etc.

According to an embodiment of the present invention, the interface for remote monitoring 119 is configured, inter alia, to provide support for data formats and protocols required for interaction with the external network entities 101. For example, for communication of the interface apparatus 11 with the plurality of network entities 101, the interface for remote monitoring 119 may use various protocols. Examples of suitable protocols include, but are not limited to, Hypertext Transfer Protocol (HTTP), Simple Object Access Protocol (SOAP), Secure Shell network protocol (SSH), Simple Network Management Protocol (SNMP), Session Initiation Protocol (SIP) and an expansion of SIP for instant messaging, etc.

As described above, the interface for remote monitoring 119 can also be coupled to the local dialogue organization device 150. This provision enables the interface for remote monitoring 119 to provide a voice feedback from the interface apparatus 11 to one or more network entities requesting information about the user 10. The external entities can submit a query about the current state of the user, and to obtain a response to this query in a natural language. For example, the parents of the child user may apply to the interface toy apparatus 11 with a query about the current physiological and emotional state of the child, and in response to the query, a report about the user's characteristics provided by the sensor data collection device 124 can be generated by the interface for remote monitoring 119. Then, this report can be coded by using the speech synthesizer 108, and can be transferred to the parents as an audio stream.

Specifically, the providing of a voice feedback to the network entities includes preparing the requested information by the interface for remote monitoring 119 in the form of a text string. When preparing the answer to queries from network entities, the interface for remote monitoring 119 actively cooperates with the external dialogue system 140, if the network communication is available. Alternatively, the interface for remote monitoring 119 cooperates with the local dialog organization device 142.

According to an embodiment of the present invention, the external dialogue system 140 activates the speech recognition system 141 in order to converts the query from the voice into a format suitable for automated processing, in the simplest case, into a text string. This query is then processed in the interface for remote monitoring 119.

The processing includes identification of the type of the query and the requested characteristics. Then, on the basis of the data available from the front-end monitoring system and information on the matching patterns, a report is generated for this query. This report can be generated as a certain data object and may have a tree-like structure and be submitted in any of the known formats suitable for presentation of data in a tree-like structure, for example, in XML format, JSON format, etc. Then, depending on availability of the network communication, the report can be relayed either to the external dialogue system 140 or to the local dialog organization device 142 for generation of a response to the query in a regular form, e.g., as a text string.

This text string is then relayed to the speech synthesizer 108 together with the address of the recipient of this information. The speech synthesizer 108, in turn, generates an audio stream that represents the voiced speech of the required information. Then, the audio stream is coded to a format suitable for data transfer by the encoding and decoding module 109. Thereafter, this coded audio stream is relayed to the wireless network connector 120 for forwarding to the recipient, for example, to a communication device 145 of a parent of the child user 10 or to another supervising network entity 101.

The wireless network connector 120 is configured for providing a wireless signal linkage between the interface apparatus 11 and said plurality of network entities (101 in FIG. 1) over the communication network 102. The wireless network connector 120 can include various communication modules (not shown) that support interaction using an IP Protocol, for example Wi-Fi protocols including the 802.11 family (such as 802.11a, b, g, n, ac, ad), communication modules using cellular standards, such as GSM (including GPRS and EDGE), UMTS, LTE, Wi-MAX and other wireless standards and protocols. Moreover, the wireless network connector 120 can include local wireless communication tools, such as Bluetooth, ZigBee, NFC, etc.

As described above, the interface apparatus 11 includes the configuration and control system 129 that is coupled to the wireless network connector 120. The configuration and control system 129 can be implemented through any suitable combinations of hardware, software, and/or firmware, and is configured for automatic configuration, reconfiguration and control of functionality of the interface apparatus 11 that includes selecting desired functional characteristics of the interface apparatus, and adjusting the interface apparatus to operating conditions of the communication network 102.

Functional characteristics of the interface apparatus are a complex of the internal parameters of the apparatus that determine current operational state of the interface apparatus. For example, functional characteristics can include, but are not limited to, sensitivity and measurement accuracy of the front-end monitoring system (which depends, inter alia, on the polling rate of the sensor data collection device), codec parameters in the encoding and decoding module used for processing multimedia input and output data, current mode and speech parameters of the embedded speech synthesizer, operational parameters of the decision maker device, etc.

The configuration and control system 129 is also configured for automatic reconfiguration and control of functionality of one or more network entities 101, so as to adjust operation of the network entities to the predetermined requirements imposed on the network entities for the desired interaction that cooperate with the interface apparatus. Furthermore, by using dynamically (on the fly) the external and internal functions of the interface apparatus, the configuration and control system 129 can provide automatic adaptation of the interface apparatus to the changing operating conditions of the network which include, but are not limited to, the presence or absence of network access, and changes of the quality of the network parameters during operation. Examples of the network parameters include, but are not limited to, data transfer rate, available bandwidth, data throughput, transfer delay, jitter, bit error rates, etc.

According to an embodiment of the present invention, the configuration and control system 129 is also involved in adaptation of the systems and devices of the external network entities that provide various services, to the terms of agreement between the providers of these services and their client, such as the user of the smart interface apparatus, on the quantity and quality of the services.

According to an embodiment of the present invention, the configuration and control system 129 includes a reconfiguration device 132 configured for dynamic reconfiguration of functionality of the interface apparatus 11, a cyber certificate database controller 131 coupled to the reconfiguration device 132 and a cyber certificate database 130 coupled to cyber certificate database controller 131.

According to an embodiment of the present invention, the reconfiguration device 132 is configured to control automatic configuration of functions of the interface apparatus 11 and operation of the external network entities that interact with the interface apparatus 11. Control can be carried out dynamically (on the fly) by controlling operation of the internal devices of the interface apparatus and functions of the external network entities for desired interoperation with the interface apparatus.

In particular, in operation, the reconfiguration module 132 provides automatic adaptation of the interface apparatus 11 to changing operating network conditions. Examples of the operating network conditions include, but are not limited to, the presence or absence of network access and the quality of network parameters (e.g., data transfer rate, available bandwidth, data throughput, transfer delay, jitter, bit error rates, etc.).

The reconfiguration module 132 is also involved in adaptation of the interaction of the network entities cooperating with the interface apparatus 11 to the terms of an agreement on the quantity and quality of the external cloud services between the providers of these services and their client (i.e., the user or owner of the interface apparatus).

In operation, the reconfiguration device 132 through the wireless network connector 120 checks availability of network communications. According to an embodiment of the present invention, the wireless network connector 120 receives inquiry from the reconfiguration device 132 to find an available network, receives information about the current operating network conditions, and forwards this information to the reconfiguration device 132. Depending on the availability of the network communications and the quality of the performance of the network infrastructure, the reconfiguration device 132 switches the interface apparatus 11 to operate in one of the following three modes:

(I) When access to the Internet is available and the magnitudes of the network performance parameters are within the range required for proper operation, the interface apparatus 11 operates with maximum functionality, and uses all available (under the terms of the agreement with the providers) external cloud services which are provided by the external network entities 101. In this case, the reconfiguration device 132 configures and controls interaction with the external network entities 101 in accordance with the terms of the agreement of the user with the providers.

(II) In the absence of access to the Internet or if the magnitudes of the network parameters of the Internet are out of the range required for proper operation, but nevertheless, in the presence of a local area network (LAN), e.g., a home network, the reconfiguration device 132 of the configuration and control system 129 switches the interface apparatus 11 to an operation mode with a limited external functionality. In this mode, the interface apparatus 11 seeks the required services only among those which are available in the LAN. The searched LAN services can be analogues to the external cloud services (e.g., speech recognition and conducting dialogue with the user, support for parental control and monitoring of the child user, etc.), however with less resources. If such services are found in the LAN, these services could be activated to perform the required tasks for the interface apparatus.

(III) In the absence of any kind of network access, the configuration and control system 129 switches the interface apparatus 11 to an autonomous (i.e., offline) mode, in which the interface apparatus 11 relies solely on its internal resources, such as the local dialog organization device 142, the front-end communication system 112, the front-end monitoring system 113, the decision-making system 114, etc.

According to an embodiment of the present invention, the cyber certificate database 130 participates in dynamic reconfiguration of the operations and functionality of the interface apparatus 11, as well as in dynamic reconfiguration of the operations of the network entities 101 for the desired interaction with the interface apparatus 11 to provide required external cloud services to the user 10. According to an embodiment, the cyber certificate database 130 stores one or more data objects or data complexes including multiple interrelated data objects having a tree-like internal structure that can be expressed by means of any structured data description language, such as XML, JSON, etc. The cyber certificate database 130 may include one or more data sections. Each data section can, for example, be represented by a separate object data, including one or more records.

Thus, according to some embodiments of the present invention, the cyber certificate database 130 can include a section with records of functional characteristics of the interface apparatus 11. The functional characteristics of the interface apparatus are a complex of internal parameters that determine current operation state of the interface apparatus. For example, functional characteristics can include, but are not limited to, the sensitivity and measurement accuracy of the front-end monitoring system (which depends on the polling rate of the sensor data collection device 124), the codec parameters in the encoding and decoding module 109 when processing multimedia input and output data, the current mode and speech parameters of embedded speech synthesizer 108, the operational parameters of the decision maker device 128, etc.

Thus, this section of the cyber certificate database 130 can include a declarative description of the configuration parameters and the current state of the internal devices of the interface apparatus 11.

The devices of the interface apparatus 11 can be configured to operate in various modes with different functional characteristics. For example, a sensitivity of the front-end monitoring devices MDs of the front-end monitoring system 113 can be controlled. In particular, the sensitivity and measurement accuracy can be high, when the front-end monitoring devices MD is required to react to slight changes in monitored parameters of the user. However, a sensitivity and measurement accuracy of the front-end monitoring devices MDs can also be low, when changes in monitored parameters may be relatively large, and quick reaction on the monitored parameters of the user is required.

According to a further example, the sensor data collection device 124 can be configured for receiving user state patterns measured only by selected front-end monitoring devices MDs of the front-end monitoring system 113. Depending on the measurement requirements, the front-end monitoring devices MD that were not selected for operation, can be temporarily disabled, and therefore do not operate. Furthermore, the section of the cyber certificate database 130 with the configuration parameters of the sensor data collection device 124 can include a polling rate for defining how often a poll should be conducted for checking the front-end monitoring devices that operate in the interface apparatus 11 at any specific time. Depending on the measurement requirements, a polling rate can be changed dynamically, because on the one hand, a high polling rate allows more accurate monitoring of the user, and on the other hand, a large amount of received monitored data of patterns may delay handling the data by the processor within a certain time period.

According to yet an example, the speech synthesizer 107 of the communication processing system 111 can also be configured to have various voice characteristics and speaking styles of the synthesized voice, e.g., a male voice or a female voice, a child voice or an adult voice, a phrase intonation, simulations of speaker emotions, etc.

According to still a further example, the encoding and decoding module 109 can also have a variety of options for coding and decoding of audio and video signals. In particular, a configuration section of the cyber certificate database 130 may include a record with description of the specific codecs used to encode and transmit the audio and video streams.

It should be understood from the above examples, that each particular interface apparatus 11 may have different settings and modes of operation. It should be understood that although examples of configurations are described above only for several devices of the interface apparatus 11, other devices and systems of the interface apparatus 11 can also be configurable, mutatis mutandis. These configurations settings of all the elements of the interface apparatus 11 are stored in the cyber certificate database 130. The sections with records of the configurations for all the devices stored in the cyber certificate database 130 can be dynamic in nature. Accordingly, the records in the cyber certificate database 130 may be changed dynamically during operation of the interface apparatus 11.

According to some embodiments of the present invention, the cyber certificate database 130 can further include a section with records of predetermined requirements imposed on the services provided by the network entities in order to provide those functional characteristics of these services which are required to the specific interface apparatus for seamless interoperability with the corresponding entities.

According to an embodiment, the predetermined requirements can have a hierarchic structure. At the top level of the hierarchic structure the record of the database 130 includes a list of the services with which the given interface apparatus is compatible. At the lower level of the hierarchic structure the record includes functional characteristics of the external network entities 101 which are selected to cooperate with the interface apparatus for a predetermined purpose. This section describes the functional characteristics required for the external network entities so as to ensure a seamless interoperation with the interface apparatus 11. This section is usually pseudo-dynamic, in the sense that the records do not change on the fly, but rather are updated as a result of a dedicated process of configuration of the interface apparatus, e.g., during replacement of the firmware of the interface apparatus 11. Initially, this section can, for example, be completed by a manufacturer of the interface apparatus during its manufacture. Later, this section can be updated when the firmware of the interface apparatus is updated.

For example, when the interface apparatus is used exclusively for conducting dialogues with the child, and is not intended for monitoring physiological characteristics of the user, the cyber certificate database 130 includes a section with a record, which has an instruction to connect to an external (cloud) network entity that can provide a speech recognition service. When desired, this speech recognition service may, for example, activate a feature for recognition of an emotional state of the child's speech, if this feature is available in this external network entity. Moreover, the record may include instructions to employ an intellectual knowledge search service, if this service is provided by a corresponding external (cloud) network entity. However, since conducting of dialogues with the user does not involve monitoring of child's characteristics, this section should include also a record with an instruction for disabling operation of the sensor data collection device 124.

According to another example, the interface apparatus can be used exclusively for monitoring child diseases, symptoms and signs of disease. In this case, the cyber certificate database 130 can include a section with a record, which has an instruction to connect to an external (cloud) network entity that can provide automatic health monitoring and diagnosis service, and is able to recognize symptoms of certain diseases (e.g., an epileptic seizure).

According to one embodiment of the present invention, the section in the cyber certificate database 130 with a record of predetermined requirements imposed on the external network entities can include mere abstract declarations (i.e., statements of types and categories) of the required services without identification of their specific addresses (e.g., URLs) for access through the Internet. In this case, the concrete services specified in such a record will be searched by the corresponding external (cloud) network entity (101*a* in FIG. 1) that is dedicated for providing various services required for control, configuration, diagnostics and support of various services cooperating with the interface apparatus 11.

According to an embodiment of the present invention, the system 100 includes such an external network entity (referred to as an entities control system 133) that is designed for providing various services required for control, configuration, diagnostics and support of various services cooperating with the interface apparatus 11. It should be understood that the entities control system 133 can be implemented through any suitable combinations of hardware, software, and/or firmware.

According to an embodiment of the present invention, the entities control system 133 is run by a dedicated provider (not shown) and is configured for providing various cloud services assigned to the interface apparatus 11, in accordance with a predetermined service agreement between a customer (e.g., the owner or user of the interface apparatus) and this provider. For instance, the customer can have a service contract with the provider.

As will be described hereinbelow in detail, the entities control system 133 cooperates with the reconfiguration module 132 of the configuration and control system 129, and conducts search and configuration of the cloud services of the provider for interaction with interface apparatuses 11, in accordance with the terms of service agreements between the provider of cloud services and the owner of the interface apparatus 11. The entities control system 133 can, inter alia, be configured for conducting a semantic search and management of interaction with the network entities that provide cloud search services to the user 10 of the interface apparatus 11.

According to some embodiments of the present invention, the cyber certificate database 130 can further include a section with a record including a description of the functional characteristics of those network entities that provide services to which the interface apparatus has a right to access, in accordance with the predetermined service agreement. This section may also include records with indications of quality of these services, and functional options available in accordance with the terms of the agreement (contract) between the provider of cloud services and the client (i.e., the owner or user 10 of the smart interface apparatus 11).

For example, if the interface apparatus 11 is intended exclusively for conducting dialogue conversations with the user, it can have access only to some specific service features provided by the corresponding network entities stipulated by the contract with the provider of the cloud services. For instance, the entities control system 133 can provide speech recognition service, but concurrently disable the feature of providing emotional color of the speech, because in the agreement between the client and provider this option was not included. Likewise, the entities control system 133 can support the feature of organization and conducting dialogues, but disable the feature of adaptation of the speech to the user's emotions, because this option was not included in the contract with the service provider.

According to another example, the interface apparatus 11 was subscribed exclusively for remote child monitoring service. After subscription, this service is added to the contract with the provider and correspondingly to the predetermined service agreement section of cyber certificate database 130. In this case, the entities control system 133 can find such service upon request of the reconfiguration module 132, and then configure the entity providing this service for interoperation with the given interface apparatus.

According to an embodiment of the present invention, the record of the cyber certificate database 130 that includes the predetermined service agreement (stipulated by the contract with the provider of cloud services) is "static", in the sense that it cannot be changed by means of the interface apparatus itself. In this case, the records may only be changed during the special configuration of the interface apparatus by the cloud service provider. This record in the cyber certificate database 130 can, for example, be protected by a digital signature of the provider of cloud services. Moreover, the record can also be encrypted by means of cryptographic protection of the data.

According to some embodiments of the present invention, the cyber certificate database 130 can further include an archive section including a record with a description of interactions of the user 10 with the interface apparatus 11. The archive section stores history information about all the transactions and events occurred chronologically in the history of the interactions of the user 10 with the interface apparatus 11.

For example, the archive section can include history information about dialogues of communication of the user with one or more external network entities that provide dialogues with the user. Configuration and operation of such entities will be described hereinbelow in detail.

According to another example, the archive section can include history information about dialogues of the communication of the user with the interface apparatus itself. As was described above, this feature can be supported by the local dialogue organization device 150 built-in the interface apparatus 11.

According to still another example, the archive section can include history information about all the recognized situations that occurred during the interactions of the user with the interface apparatus, presented, for example, chronologically in a historic perspective.

According to some embodiments of the present invention, the cyber certificate database 130 can further include a section with a cyber portrait of the user. The cyber portrait can, for example, include one or more characteristics selected from cognitive characteristics of the user, behavioral characteristics of the user, physiological characteristics of the user, mental characteristics of the user, etc. These characteristics can, for example, be derived from automatic research, diagnostics and statistics carried out by the decision-making system 114 of the interface apparatus 11 as a result of an analysis of the data collected by the front-end monitoring system 113. Likewise, the cyber portrait of the user can be formed from operation of the corresponding external entities, as will be described hereinbelow in detail.

It should also be noted that the cyber certificate database 130 may further include any other sections required for interaction of the interface apparatus 11 with the network entities 101.

According to an embodiment of the present invention, the cyber certificate database 130 is controlled by the cyber certificate database controller 131 that is configured for controlling access to the records stored in the cyber certificate database 130 for reading and updating records of one or more sections of the cyber certificate database 130. For example, the functions of the cyber certificate database controller 131 include, but are not limited to, retrieving data from records of the relevant sections of the cyber certificate database 130; adding and updating data in records in the relevant sections of the cyber certificate database 130; controlling access of external entities to records in the relevant sections of the cyber certificate database 130; monitoring and ensuring data integrity of the cyber certificate database 130, for example, by creation of backups, use of a special coding, support of the possibility of data recovery in the cyber certificate database 130, etc.

In operation, the cyber certificate database controller 131 receives requests to access the certain sections of the cyber certificate database 130 to retrieve records thereof, and/or requests for modification (update) of the records of corresponding sections of the cyber certificate database 130. These requests can be received from the reconfiguration module 132 as well as from the corresponding external network entities through the wireless network connector 120. After receiving the requests, the cyber certificate database controller 131 updates the corresponding records in the cyber certificate database 130, or retrieves data from the corresponding records and redirects these data to the requester.

According to an embodiment of the present invention, automatic search and configuration of the external cloud systems and devices of the network entities interacting with the interface apparatus 11 for providing various services are carried out by the reconfiguration module 132 in cooperation with the cloud entities control system 133 that is operated by a provider of the cloud services.

In operation, the reconfiguration device 132 receives external signals from the entities control system 143 to adjust the interface apparatus to the operating conditions of the communication network 102. Moreover, the reconfiguration module 132 participates in the adjustment of operation of the external network entities to the predetermined requirements imposed on these network entities for interaction with the interface apparatus 11.

According to some embodiments of the present invention, configuration of the external network entities for interaction with the interface apparatus 11 is carried out in two stages. In the first stage, a selection and configuration of the network entities is carried out in accordance with the predetermined service agreement between the user and the provider of the cloud services. In this case, the dynamic reconfiguration device 132 of the interface apparatus 11 sends a request to the entities control system 133 for fetching a specific network entity required for this interface apparatus. The request includes a list of desired functionality and working parameters consistent with the predetermined service agreement between the user and the provider. These parameters can be stored in the corresponding record of the cyber certificate database 130. In turn, the entities control system 133 provides a search of the required network entity, configures and parameterizes this network entity as requested in the order, and provides an interaction session of the entity with the interface apparatus 11.

For example, in order to establish communication between the interface device and the external dialogue system 140, the dynamic reconfiguration device 132 forms a request declaring that a network entity providing dialogue service required for this interface apparatus with a list of specific requirements. Examples of the requirements include, but are not limited to, a condition that the external network entity is owned and maintained by the specified provider (with whom the owner of the toys has a licensing agreement for providing services); a condition that the external network entity provides a service for conducting dialogues with the user of the interface device; the external dialogue system should also provide an analysis of emotional speech features, when such features are required for conducting dialogues; the external dialogue system should have a search engine to be able to retrieve information from a database for a special knowledge, e.g., in the field of biology, geography, etc.

According to an embodiment of the present invention, the reconfiguration module 132 sends a request to the cyber certificate database controller 131, which retrieves records from two types of sections of the cyber certificate database 130. The records from the section of the first type include predetermined service requirements including a description of the functional characteristics of the network entities 101 required to the specific interface apparatus 11 for a certain purpose, whereas the records of the second type include predetermined service agreement including a description of the functional characteristics of the network entities 101 that provide those required services to which the interface apparatus has permission to access, in accordance with the agreement between the owner (or user) of the specific interface apparatus 11 and the providers of the required services.

These two types of records are provided to the reconfiguration module 132. In turn, the reconfiguration module 132 forwards these two types of records to the entities control system 133 through the wireless network connector 120. These records are forwarded together with a request for connection to the specified cloud services with the required functional options and with required quality of the service parameters, which are declared in these two records.

Upon receiving a request including a description of the required services from the reconfiguration module 132, the entities control system 133 analyzes the corresponding sections in the cyber certificate database 130 in which the predetermined service agreement is stored (describing the services to which the interface apparatus has permission to access), identifies the corresponding network entity providing the requested service, and verifies the conformity of the records in the cyber certificate database 130 with the description of the predetermined service requirements (including the functional characteristics of the network entities), so as to ensure that these network entities enable providing the required services. This verification can, for example, be carried out by using the digital signature of the corresponding service provider, in order to exclude possible situations of fraud and unauthorized modification of data for this record. This record can be decrypted (if it is stored in the cyber certificate database 130 in an encrypted form). Then, the entities control system 133 conducts a search of those network entities that provide the cloud services defined in the corresponding records of the cyber certificate database 130.

Further, the network entities (that were found by the entities control system 133) are configured to provide the interface apparatus 11 with all the necessary functional options and the quality of the requested services. After configuration of the network entities 101, the entities control system 143 sends a report to the reconfiguration module 132 on results of the configuration along with the specified network addresses of the services, and the access conditions to all the configured cloud entities. From this moment, the interface apparatus 11 can interact with these network entities for common solving of the desired problems, e.g. for conducting dialogues with the child, providing parents monitoring and control, detailed analysis of the situations which occurred with the child, etc.

In the second stage, a further configuration of the interacting network entity is carried out by the reconfiguration device 132 during interaction. In particular, during interaction of the interface apparatus with an external entity, the interface apparatus may require some additional, certain special control actions on these services (within the borders of the general configuration carried out at the first stage), e.g., to disable, temporarily, speech analysis, if necessary, and then to turn it back on. Likewise, to instruct the external dialogue system 140 to switch the dialogue style to another virtual communication partner, and accordingly to provide another response to the same replica of the user. For this purpose, the reconfiguration device 132 sends control signals to the relevant network entities for further parameterization of their cooperation with the interface apparatus 11, in accordance with the specific technical capabilities of the particular interface apparatus. In operation, the reconfiguration module 132 provides instruction signals to the cyber certificate database controller 131 to read and update the records stored in the cyber certificate database 130 with information about the current situation, for example, with the current information about the network entities which currently cooperate with the interface apparatus and the current parameters of these network entities.

After these two configuration stages, the interface apparatus 11 can interact with the configured external entities to jointly solve the required tasks. Examples of such tasks include, but are not limited to, conducting speech dialogues with the child, parental control and monitoring of the child user, detailed analysis of situations with a child, etc.

In operation, a user or a supervisor of the user of the interface apparatus can carry out a first configuration and/or further reconfiguration of the interface apparatus 11. A reconfiguration of functionality of the interface apparatus results in the changes of the functionality of the interface apparatus as well in the changes of the terms of conditions for providing cloud services.

The supervisor of the user can, for example, be a parent of the child user 10 or any other owner of the interface apparatus 11. The configuration and reconfiguration of the interface apparatus as well as the parameterization of the services for operation of the interface apparatus can, for example, be carried out by using a supervisor communication device 145 through a supervisor support system 144. The supervisor support system 144 is a network entity providing support for control by a supervisor of the interface apparatus and monitoring of the user 10. Examples of the suitable supervisor communication devices 145 include, but are not limited to, smart phones, tablet computers, personal digital assistance (PDA) devices, laptop computers, smart TV devices, multimedia devices (e.g., set-top-boxes) with access to IP networks or any other devices that can provide communication through the network 102.

For example, as a result of the corresponding instructions of the supervisor, the supervisor control system 144 can form a special declaration data prescribing predetermined characteristics of the interface apparatus, which are needed for its operation and access to the cloud services assigned to the interface apparatus. For example, the parents can carry out a remote setting of the toy's parameters, e.g., to switch off the function for recognition of emotional state of the child from his speech, etc.

The declaration data can, for example, be signed by a digital signature of the provider, and optionally barred from public access by means of cryptographic protection of the data. Thereafter, this configuration data signal that bears the declaration data, is forwarded through the wireless network connector 120 to the reconfiguration module 132 cooperating with the cyber certificate database controller 131 of the configuration and control system 129 of the interface apparatus 11.

Responsive to this configuration data signal, the reconfiguration module 132 provides a corresponding instruction signal to the cyber certificate database controller 131 to make or update a corresponding record in the cyber certificate database controller 131 with a description of functional characteristics of the network entities that provide various services to which the interface apparatus 11 has permission to access.

Following the above description of the interface apparatus 11, examples of several network entities 101 interacting with the user using the interface apparatus 11 will be described hereinbelow in detail.

According to an embodiment of the present invention, the interface apparatus can interact with an external dialogue system 140. In relation to the interface apparatus 11, this system is an external network entity (101b in FIG. 1) that provides additional functionality to the interface apparatus 11. The external dialogue system 140 is configured for organization and conducting natural language dialogues with the user and can be implemented through any suitable combinations of hardware, software, and/or firmware.

In operation of the interface apparatus shown in FIGS. 3 and 4, the external dialogue system 140 receives from the wireless network connector 120 the coded information input signals captured by the microphone 117 of the front-end communication system 112 and coded by the encoding and decoding module 109. These coded information input signals are analyzed by the external dialogue system 140. In response to these input signals, coded information output signals are generated as a reaction to the coded information input signals. This analysis is performed generally in similar manner to the analysis performed by the local dialogue organization device 150, however has more extended facilities, as will be described hereinbelow in detail.

According to an embodiment, the external dialogue system 140 includes a speech recognition system 141 configured for receiving coded information input signals which originates from the front-end communication system and transforming these signals into data suitable for computer processing, and a dialogue manager 142 coupled to the speech recognition system 141. The dialogue manager 142 is configured to process the data received from the speech recognition system 141 and to generate the coded information output signals responsive to the input signals.

According to some embodiments of the present invention, the speech recognition system 141 provides a speech recognition service that allows for the interface apparatus to conduct dialogues with the user in natural languages. In operation, speech recognition system 141 recognizes speech fragments received from the interface apparatus 11 and converts the speech fragments into a format suitable for computer processing. Then, these data of the converted speech fragments are subsequently transmitted to dialogue manager 142 for further processing.

For example, the data generated by the speech recognition system 141 can be represented as text strings. Likewise, these data may be presented as data objects having arbitrary tree-like internal structure, expressed, for example, by such known markup languages as XML, JSON, etc.

Speech recognition may be carried out by any suitable algorithm Examples of the suitable speech recognition algorithms include, but are not limited to, a method of hidden Markov models (HMM), a sliding window method, a method of dynamic time warping, methods based on neural networks, etc. These methods are known per se, and therefore are not expounded herein in detail.

According to an embodiment of the present invention, the interface apparatus can use several alternative speech recognition services, provided by different providers having different functional characteristics. Moreover, the speech recognition services can have different characteristics. In particular, different interface apparatuses may receive services with different functionality and quality, depending on the current settings of service agreement between the service provider running the speech recognition system 141 and the corresponding customers. The customers can, for example, be owners of the interface apparatus, such as the parents of the child users.

The speech recognition system 141 (providing the speech recognition service) can have a variety of adjustable speech parameters and additional functions. For example, the speech recognition system 141 can be tuned to one or more specific speech languages and include the ability of automatic language detection. Moreover, the speech recognition system 141 can include the ability to operate with several languages and to provide for speech recognition of spoken words and phrases in different languages. Further, the speech recognition system 141 can include the ability of automatic age classification of the voice of the user based on the speech characteristics, i.e., to classify the speaker according to his age and to determine whether the speaker is a child, a teen, an adult, or an old person. Furthermore, the speech recognition system 141 can include the ability to determine gender characteristics of the speaker (e.g., a male or a female). Likewise, the speech recognition system 141 can include the ability for automatic detection of emotional states of the speaker, and other speech parameters.

Control of the speech recognition system 141 of the external dialogue system 140 can be dynamic in nature during the sessions of its interaction with the corresponding interface apparatuses 11, and can be carried out as a result of cooperative work with the configuration and control system 129 and with the entities control system 133.

As described above, in operation, the reconfiguration device 132 of the configuration and control system 129 sends a request to the entities control system 133 on a required service with the desired operating parameters and functionality for this particular interface apparatus 11. Responsive to this request, the entities control system 133 conducts the required search, finds an external entity 101 which provides the requested service, configures (parameterizes) the service in accordance with the requested characteristics, and provides a service interaction session of this entity with the interface apparatus.

Examples of the existing speech recognition services suitable for the purpose of the present invention include, but are not limited to, a speech recognition service of Google (e.g., the Google Voice Search feature which is run in mobile devices based on the Android operating system), voice services used in the Siri Assistant of Apple, etc.

According to an embodiment, the dialogue manager 142 is configured for organization and conducting an interactive dialogue between the interface apparatus 11 (e.g. in the form of a smart child's toy) and the user 10 (e.g., a child). In operation, the speech recognition system 141 provides the dialogue manager 142 with a dialogue replica presented in a format suitable for computerized processing. As described above, this dialogue replica may for example, be in the form of a text string (i.e., a line of text) or a structured data object. This dialogue replica can be provided together with the results of additional analysis of speech, such as classification of the speaker by age, gender, emotional state of the speaker, etc. Then, the dialogue replica is analyzed (for example, by using a semantic analysis based on known patterns of anthologies), and a context model of conversational situations is formed based on the results of the analysis of the dialogue replica together with additional data on the characteristics of the speaker. When the context model has been formed in the previous dialogue session, an adjustment of the previously formed model can be made. Then, the dialogue manager 142 generates a response replica (or a series of response replicas), taking into account the current context model of conversational situations. The response replica can be generated in a format suitable for automatic computer processing, e.g. in the form of a text string or a structured data object. Then, the response replica is transferred to the wireless network connector 120 of the interface apparatus 11, which in turn relays it to the speech synthesizer 108 of communication processing system. In turn, the speech synthesizer 108 transforms the response replica into a voice speech output signal in a natural language. Then, this voice speech output signal is fed to the speaker 115 of the front-end communication system 112 for outputting it to the user 10.

According to an embodiment, the dialogue manager 142 can also provide the speech synthesizer 108 with additional attributes of the voice data signals, such as with characterization of the voice options (male, female or child voice), and how to pronounce all the fragments of the response replica (e.g., volume, timbre, intonation and emotional color of each portion of the spoken response replica). These data attributes can have an arbitrary tree structure, and can be expressed by means of known data description languages, such as language VoiceML, etc.

For a more extensive and accurate model of the speech context, and thus for achieving a more accurate dynamic adaptation of the dialogues under complex situations of interaction with the interface apparatus, the dialogue manager 142, in addition to the contextual data generated from speech recognition system 141, can also send inquiries to the interface for remote monitoring 119 from which it can obtain information about the recognized current situations along with the flow of data from one or more front-end monitoring devices of the front-end monitoring system 113.

According to an embodiment of the present invention, different interface apparatuses may use the same or several alternative dialogue services offered by different providers and having different functional characteristics. Moreover, different interface apparatuses using the same service may receive different types of functionality and quality of the service, depending on the current settings of service agreement between the service provider and its customer (i.e., the owner or user of a particular interface apparatus 11).

According to an embodiment of the present invention, the external dialogue system 140 can include a search engine 143 configured for search and retrieval of various information and knowledge on certain topics from other entities. It should be understood that during dialogues with a user, certain situations can occur in which the user can ask sophisticated questions. Accordingly, in order to generate qualitative responses to these sophisticated questions, the dialogue manager 142 may be required to acquire certain knowledge on specific subjects. In these cases the external dialogue system 140 can use the search engine 143 and obtain knowledge about a particular fact, phenomenon or other subjects.

In operation, the search engine 143 receives a search query from the dialogue manager 142 required for satisfaction of the user's information needs. The query can, for example, be formulated as a regular text line. The search engine 143 conducts a search and provides the dialogue manager 142 with the requested information.

It should be understood that the dialogue manager 142 can use several alternative intellectual knowledge search services offered by different providers, each having different functional characteristics. An example of the search engine 143 includes, but is not limited to, the intellectual knowledge search engine Wolfram Alpha developed by Wolfram Research. This is an online service that answers factual queries directly by generating an answer from the structured data. It should be understood that when more than one search engine is employed, the different search engines may receive a different type of functionality and quality of the search service, depending on the current settings of the service agreement between the service provider and its customer (e.g., the owner or user of a particular interface apparatus 11).

The control and management of the search engine 143 can be dynamic in nature and carried out during the interaction sessions of the dialogue manager 142 with the corresponding search services provided by the search engine 143. Control can be carried out as a result of the cooperative work of the dialogue manager 142 with the configuration and control system 129 and the entities control system 133. In operation, the reconfiguration device 132 of the configuration and control system 129 sends a request to the entities control system 133 on the required dialogue service with the desired operating parameters and functionality for the particular interface apparatus 11. Responsive to this request, the entities control system 133 conducts the required search of the external dialogue system 140, configures the dialogue service in accordance with the parameters recorder in the cyber certificate database 130 and provides the dialogue service interaction session with the interface apparatus 11.

According to an embodiment of the present invention, the interface apparatus can interact with the supervisor communication support system 144. In relation to the interface apparatus 11, this system is an external network entity (101c in FIG. 1) that provides additional functionality to the interface apparatus 11.

The supervisor communication support system 144 is configured for supporting connection of the supervisor communication devices 145 to the interface apparatus 11. In particular, the supervisor communication support system 144 is configured to find a supervisor communication device 145 used by a supervisor of the user 10, and to support communication of the user interface apparatus 11 with the supervisor communication device 145.

For example, the user can be a child, and the supervisor can be a parent of the child. In this case, the interface apparatus 11 can be in the form of a smart interactive toy with which the child is regularly in immediate contact. The supervisor communication device 145 can be a smart phone, a tablet computer, a laptop and any other smart communication device available to the parent. In operation, the parent communication device 145 is connected to the supervisor communication support system 144, and sends requests to perform certain functions for access to the interface apparatus (e.g., the smart child's toy) 11.

According to one example, the parent communication device may sent a request to the supervisor communication support system 144 for obtaining access to the video and audio signals of the video camera 116 and the microphone 117 for remote monitoring of the child user 10. According to another example, the parent communication device may send a request to the supervisor communication support system 144 for obtaining organization of the voice channel for remote communication with the child. According to a further example, the parent communication device may send a request to the supervisor communication support system 144 for retrieving data from all the front-end monitoring devices (MD) of the front-end monitoring system 113. According to yet another example, the parent communication device may send a request to the supervisor communication support system 144 for obtaining notifications of the recognized situations occurring with the child user which are of interest to the parents. According to still another example, the parent communication device may send a request to the supervisor communication support system 144 for obtaining a history of dialogues of interactions of the child with the external dialogue system 140 and with other cloud services, etc.

Upon receiving a request from the supervisor (parent) communication device 145, the supervisor communication support system 144 approaches the available resources of the interface apparatus via the wireless network connector 120 and obtains an encoded video stream from the camera 116 and an encoded audio stream from the microphone 117. Likewise, through the interface for remote monitoring 119, the supervisor communication support system 144 obtains a stream of notifications of emerging situations occurring with the child, and also obtains access to a stream of raw data from all the front-end monitoring devices of the front-end monitoring system 113. The information data obtained thereby are processed, and then are forwarded to the supervisor communication devices 145.

According to a further embodiment of the present invention, in order to establish a long distance two-way voice/image communication between the child and the parent, the supervisor communication support system 144 can send audio and/or video streams that contain the voice and image of the parent from the parent communication device 145 to the interface apparatus 11. These audio and video streams can be played through the speaker 115 and display 118 built-into the interface apparatus 11. In turn, the voice and image of the child captured by the built-in microphone 117 and video camera 116 can be captured by the supervisor communication support system 144 and forwarded to the parent communication devices 145.

Moreover, as described above, by using the supervisor communication support system 144, the parents or any other supervisors can perform configuration and management of the functionality of the interface apparatus 11 and the interaction of the interface apparatus 11 with the cloud services provided by the network entities 101 serving this interface apparatus 11.

According to an embodiment of the present invention, the interface apparatus 11 can interact with a situation identification system 146 that is coupled to the supervisor communication support system 144. In relation to the interface apparatus 11, this system is one of the external network entities 101 that provides additional functionality to the interface apparatus 11. The situation identification system is configured for receiving the coded information input signals from the front-end communication system and the user state patterns forwarded by the decision-making system, and for providing analysis thereof for identification of various situations occurring with the user, and notification of the supervisor communication support system 144 about the situations as they are discovered.

The functionality and nature of the tasks of the situation identification system 146 largely duplicate and expand the functionality of the decision-making system 114. However, in contrast to decision-making system 114, the situation identification system 146 does not perform any active action. The main task of the situation identification system 146 is analysis of the data flows from the interface apparatus to reveal all sorts of situations occurring with the child and notifying the supervisor communication support system 144 about these situations as they are discovered.

Resources of the situation identification system 146 can be greater than the resources of the pattern recognition and decision-making system 114. This provision allows more fine and granular analysis, including substantive analysis of the situations. For example, a detailed analysis of the situation identification system 146 can be a specialized medical diagnostic service, which can provide remote diagnostics of the health status of the child on the basis of the information signals received from the interface apparatus. Such a diagnostic service may include the detection and tracking of the external behavioral symptoms of some diseases, such as epilepsy, cerebral palsy and others.

According to an embodiment of the present invention, the situation identification system 146 may receive the information signals originating from the microphone 117. In this case, the user information input signals generated by the microphone 117 are processed by the communication processing system 111 and then are fed to the wireless network connector 120 that in turn relays the corresponding coded signals to the situation identification system 146. For example, the situation identification system 146 can be configured to perform analysis of the sound environment around the child, and the child's speech, when desired.

According to a further embodiment of the present invention, the situation identification system 146 may also receive information signals originating from the video camera 116. In this case, user information input signals generated by the video camera 116 can be processed by the communication processing system, and then be fed to the wireless network connector 120 that relays the corresponding coded signals to the situation identification system 146. In turn, the situation identification system 146 can be configured to carry out visual analysis of the situation which occurred with the child, as well as visual analysis of the child's behavior, including recognition of current motor activity (e.g., gestures, posture, gait, character movement, etc.), activity of facial muscles (e.g., facial expressions), eye movement, etc.

According to yet an embodiment, the situation identification system 146 may also receive the raw user state patterns originating from the front-end monitoring devices of the front-end monitoring system 111. As described above, the user state patterns captured by the sensor data collection device 124 are fed to the pattern recognition device 125. If none of the user state patterns matches at least one reference state pattern stored in the pattern storage device 126, the decision making system 114 forwards these monitored user state patterns through the interface for remote monitoring 119 and through the wireless network connector 120 to the situation identification system 146 configured for handling user patterns. These pattern data from the front-end monitoring system 111, together with the incoming audio and video signals, enable the situation identification system 146 to perform detailed analysis of the received data in order to detect, identify and evaluate situations occurring with the child user 11.

According to yet an embodiment, the situation identification system 146 may also receive a description of the characteristics of voice and speech from the speech recognition system 141. These data can also be useful for detection, identification and evaluation of the situations occurring with the child user 11.

After receiving the coded information input signals from the front-end communication system and the user state patterns forwarded by the decision-making system, the situation identification system 146 performs analysis of these signals for identifying various situations occurring with the user and notifies the supervisor communication support system 144 about the situations occurring with the child user 11, as they are discovered. These notifications can further be transferred to the supervisor communication device 145, e.g., for notification of the parent or other supervisor of the child user.

In some cases, notifications of emergency situations can be transferred to other interested parties, such as to a terminal device of the doctor (not shown) in charge of the child, or to the police. When required, in case of critical situations that threaten the life and health of the child, the notifications can be transferred to rescue and other emergency services, etc.

According to an embodiment of the present invention, the front-end monitoring system 113 can receive an alternative service of the situation identification system 146 offered by the different providers having different functional characteristics. Moreover, the different interface apparatuses may receive different types of the functionality and quality of the service provided by the situation identification system 146, depending on the service agreement between the service provider and its customer (e.g., the owner or user of a particular interface apparatus 11).

The control and management of the situation identification system 146 can be dynamic in nature and can be carried out as a result of the cooperative work of the reconfiguration device 132 of the configuration and control system 129 and the entities control system 133.

According to an embodiment of the present invention, the interface apparatus 11 can interact with a peer communication support system 147 that is coupled to one or more peer interface apparatuses 148 associated with peers. For example, the user of the interface apparatus 11 can be the child user 10, the peers can be friends (not shown) of the child user, and the peer interface apparatuses 148 can be other interface apparatuses similar to the interface apparatus 11, which are used by these friends. In relation to the interface apparatus 11, the peer communication support system 147 is one of the external network entities 101 that provides additional functionality to the interface apparatus 11.

The peer communication support system 147 is configured for finding one or more other interface apparatuses 148 used by the corresponding peers to the user, and for supporting communication between the interface apparatus of the user and these other interface apparatuses 148.

The main purpose of the peer communication support system 147 is to provide a channel of communication between the different interface apparatuses that allows the users (e.g., children) associated with these interface apparatuses to place calls to each other, and thereby to communicate with each other over the network. In other words, the peer communication support system 147 operates as a switch that locates the requested interface apparatus upon the request of another interface apparatus, and provides a communication session between these two apparatuses with a channel of a voice traffic transmission in the form of the signal coded by the encoding and decoding module 109.

In operation, when the peer communication support system 147 receives a request to organize connection with another interface apparatus, it searches the requested interface apparatus, and relays this request to the found interface apparatus to start a communication session. In case of confirmation of the request, the peer communication support system 147 establishes a connection between the initiating apparatus and the searched apparatus.

In the course of further interaction of the interface apparatuses within the communication session, the voice of the child which is converted into an electronic format by means of the microphone 117 and coded by the encoding and decoding module 109 is fed to the wireless network connector 120. In turn, the wireless network connector 120 relays it to the peer communication support system 147. The peer communication support system 147 transfers this information input signal to the peer interface apparatus, which in turn, after decoding this signal by the encoding and decoding module, is relayed to the speaker of the peer interface apparatus for audio outputting.

It should be noted that a request to establish a communication session between two or more interface apparatuses may have different representations. In particular, it can be a voice query in the form of a speech snippet in a natural language. The voice query may include an instruction (command) to establish a connection together with an identification of the searched apparatus. Such recognition of the voice query and identification of the searched apparatus can be carried out by the peer communication support system 147 in cooperation with the speech recognition system 141 and the dialogue manager 142.

According to an embodiment of the present invention, the interface apparatus 11 may also use the service of one or more other peer communication support systems (alternative to the peer communication support system 147) with other functional characteristics. These other peer communication support systems can be run by other providers. It should also be understood that different interface apparatuses may receive different types of functionality and quality of the services from the peer communication support system 147 and from alternative peer communication support systems, depending on the settings of the service agreements between the service providers and its customers (e.g., the owners or users of these interface apparatuses).

The control and management of the peer communication support system 147 can be dynamic in nature and can be carried out as a result of the cooperative work of the reconfiguration device 132 of the configuration and control system 129 and the entities control system 133.

Those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. An interface apparatus for providing interaction over a communication network between a user and a plurality of network entities cooperating with said interface apparatus under a predetermined service agreement stored in the interface apparatus, the interface apparatus comprising:
   a front-end communication system including:
      at least one front-end communication input device configured for interaction with the user for receiving user input information and generating user information input signals, and
      at least one front-end communication output device configured for interaction with the user for outputting user information output signals obtained as a reaction to the user input information;
   a communication processing system coupled to the front-end communication system and configured for
      (i) receiving said user information input signals for coding thereof to a format suitable for data transferring the coded information input signals to at least one network entity selected from said plurality of network entities over said communication network to handle said coded information input signals at the end of said at least one network entity, thereby to generate information coded output signals responsive to said user information input signals; and
      (ii) receiving said information coded output signals generated by said at least one network entity; and decoding these signals to a format suitable for outputting thereof by said at least one front-end output device; and
   a configuration and control system configured for
      (i) automatic reconfiguration and control of a functionality of the interface apparatus, including: selecting desired functional characteristics of the interface apparatus; and adjusting said interface apparatus to operating conditions of the communication network, including network availability; and
      (ii) automatic reconfiguration and control of functionality of interaction of said at least one network entity with the interface apparatus, including adjusting said interaction to predetermined requirements imposed on said at least one network entity for desired cooperation with said interface apparatus in accordance with said predetermined service agreement; and
   a wireless network connector electrically coupled to said communication processing system, and to said configuration and control system; said wireless network connector configured for providing a wireless signal linkage between the interface apparatus and said plurality of network entities over the communication network.

2. The interface apparatus of claim 1, further comprising:
   a front-end monitoring system including at least one front-end monitoring device configured for interacting with the user, collecting user state information related to a state of the user and generating user state patterns indicative of the state of the user;
   a decision-making system coupled to said front-end monitoring system and to wireless network connector, and configured for receiving the user state patterns collected by said at least one front-end monitoring device, and processing thereof for taking a decision as to how to respond to the received user state patterns.

3. The interface apparatus of claim 2, further comprising an interface for remote monitoring coupled to said wireless network connector, said communication processing system and to said decision-making system, and configured for interaction of the interface apparatus with said plurality of network entities via said wireless network connector.

4. The interface apparatus of claim 1, wherein said at least one front-end communication input device of the front-end communication system is selected from a microphone configured for receiving said user input information provided verbally and converting said user information into the user information input signals corresponding to the user verbal input information; and a video camera configured for receiving said user information provided visually and converting said user information into the user information input signals corresponding to the visual user information.

5. The interface apparatus of claim 4, wherein said at least one front-end communication output device of the front-end communication system is selected from a speaker configured for audio outputting said user information output signals, and a display configured for video outputting said user information output signals, wherein said user information output signals are indicative of a reaction of said at least one network entity to said user information input signals.

6. The interface apparatus of claim 5, wherein said communication processing system comprises:
   an encoding and decoding module coupled to said at least one front-end communication input device and to said at least one front-end communication output device of the front-end communication system, said encoding and decoding module configured (i) for receiving the user information input signals including audio and video signals from said at least one front-end communication input device, coding thereof to obtain coded information input signals and forwarding said coded information input signals to the wireless network connector for relaying the coded information input signals to said at least one network entity; and (ii) for receiving coded information output signals and decoding these signals to obtain said user information output signals;

a speech synthesizer coupled to the speaker and to the encoding and decoding module for encoding and decoding audio signals, and configured to receive decoded information output signals and to generate electrical signals in a format suitable for audio outputting thereof by the speaker; and a view synthesizer coupled to the display and to the encoding and decoding module for encoding and decoding video signals, and configured to receive decoded information output signals and to generate electrical signals in a format suitable for video outputting thereof by the display.

7. The interface apparatus of claim 3, further comprising a local dialogue organization device coupled to the speech synthesizer and to said interface for remote monitoring and configured for organization of local dialogues between the user and the interface apparatus.

8. The interface apparatus of claim 3, wherein said at least one front-end monitoring device of the front-end monitoring system is selected from the list including:
   a tactile sensor configured to provide user state information indicative of a force applied by the user to the interface apparatus;
   at least one user physiological parameter sensor configured for measuring at least one vital sign of the user;
   a user location sensor configured for determination of a location of the interface apparatus;
   an accelerometer configured for detecting motion of the interface apparatus; and
   a gyroscope configured for measuring orientation of the interface apparatus in space.

9. The interface apparatus of claim 8, wherein said at least one user physiological parameter sensor is selected from the list including: a temperature sensor, a pulse rate sensor, a blood pressure sensor, a pulse oximetry sensor, and a plethysmography sensor.

10. The interface apparatus of claim 3, wherein said decision-making system comprises:
    a sensor data collection device configured for receiving the user state patterns measured by the front-end monitoring system and formatting thereof;
    a pattern recognition device coupled to the sensor data collection device and configured for comparing the user state patterns with reference state patterns stored in the interface apparatus, and generating an identification signal indicative of whether at least one of the user state patterns matches or does not match at least one reference state pattern, said reference state patterns being indicative of various predetermined states of the user and being used as a reference for determining a monitored state of the user;
    a pattern storage device coupled to the pattern recognition device and configured for storing said reference state patterns;
    a decision maker device coupled to said pattern recognition device, and configured for receiving said identification signal from the pattern recognition device, and in response to said identification signal, generating said coded information output signals indicative of at least one policy for taking said decision; and
    a policy storage device coupled to the decision maker device and configured for storing policies for the taking of the decision.

11. The interface apparatus of claim 10, wherein the policy for the taking of the decision includes:
    (i) if at least one of the user state patterns matches at least one reference state pattern, to generate said coded information output signals including advice of the decision-making system as a reaction to the monitored state of the user, and provide said coded information output signals to at least one receiver selected from
    a corresponding at least one network entity selected from said plurality of network entities configured for handling the advice, and
    said communication processing module of the interface apparatus further configured for decoding said coded information output signals for extracting the advice, and outputting the advice to the user; and
    (ii) if none of the user state patterns matches at least one reference state pattern, to forward the monitored user state patterns to at least one network entity being configured for handling the user patterns.

12. The interface apparatus of claim 3, wherein said configuration and control system includes:
    a cyber certificate database comprising at least one record selected from:
        a record with a description of functional characteristics of the interface apparatus,
        a record with a description of functional characteristics of the network entities selected to cooperate with the interface apparatus for a predetermined purpose;
        a record with a description of functional characteristics of said plurality of network entities providing services to which the interface apparatus has a right to access;
        an archive record for interaction of the user with the interface apparatus; and
        a cyber portrait of the user including at least one kind of characteristics selected from: cognitive characteristics of the user, behavioral characteristics of the user, physiological characteristics of the user, and mental characteristics of the user;
    a cyber certificate database controller coupled to the cyber certificate database, and configured for controlling an access to said at least one record stored in the cyber certificate database to read and update said at least one record; and
    a reconfiguration device coupled to said cyber certificate database controller, and configured for dynamic reconfiguration of functionality of the interface apparatus, and interaction of said at least one network entity with the interface apparatus in accordance with said predetermined service agreement.

13. The interface apparatus of claim 12, wherein said dynamic reconfiguration of the functionality includes at least one of the following actions:
    receiving external signals for (i) adjusting said interface apparatus to the operating conditions of the communication network, and (ii) adjusting operation of said at least one external entity to said predetermined requirements imposed on said at least one external entity for cooperation with said interface apparatus in accordance with said predetermined service agreement; and
    providing instruction signals to said cyber certificate database controller to read and update said at least one record.

14. The interface apparatus of claim 13, wherein said at least one entity includes an entities control system configured for receiving from said configuration and control system of the interface apparatus a request for finding at least one network entity providing services desired to the interface apparatus in accordance with the conditions of the predetermined service agreement, conducting a semantic search of said at least one network entity, adjusting the interaction between the interface apparatus and said at least one network entity to the conditions of the predetermined service agreement, and providing addresses and access conditions of said at least one network entity to said configuration and control system.

15. The interface apparatus of claim 14, wherein said at least one entity providing services desired to the interface apparatus in accordance with the conditions of the predetermined service agreement includes at least one system selected from:
   (a) an external dialogue system configured for organization and conduction of natural language dialogues with the user, configured for
      receiving at least one type of input signals selected from said coded information input signals originating from the front-end communication system, and said user state patterns provided from the decision-making system; and
      analyzing said at least one type of the input signals and generating said coded information output signals indicative of reaction on said coded information input signals;
   (b) a supervisor communication support system configured for finding a supervisor communication device used by a supervisor of the user and supporting communication of said at least one user interface apparatus with the supervisor communication device; and
   (c) a peer communication support system configured for finding at least one other interface apparatus used by a peer to the user, and for supporting communication between the interface apparatus of the user and said at least one other interface apparatus.

16. The interface apparatus of claim 14, wherein said at least one entity providing cloud services desired to the interface apparatus in accordance with the conditions of the predetermined service agreement includes a situation identification system configured for receiving said coded information input signals from the front-end communication system and said user state patterns forwarded by the decision-making system, and providing analysis thereof for identifying various situations occurring with the user and notifying said supervisor communication support system of the situations as they are discovered.

17. The interface apparatus of claim 15, wherein said external dialogue system comprises a speech recognition system configured for receiving said coded information input signals originating from the front-end communication system and transforming these signals into data suitable for computer processing, and a dialogue manager coupled to the speech recognition system, and configured to process said data and to generate said coded information output signals produced as a reaction to said coded information input signals.

18. The interface apparatus of claim 17, wherein said coded information input signals include a query signal; and wherein the external dialogue system further comprises a search engine associated with the dialogue manager and configured for receiving a processed query signal from the dialogue manager, conducting a search based on a query related to said query signal and providing search results to the dialogue manager for targeting thereof to the user; wherein said search results are included in said coded information output signals.

19. The interface apparatus of claim 17, wherein said coded information input signals include said user state patterns forwarded by the decision-making system, and wherein the external dialogue system is further configured to analyze said user state patterns forwarded by the decision-making system, and generate advice of the entity as a reaction to the monitored state of the user, wherein the entity advice is included in said coded information output signals.

20. The interface apparatus of claim 15, wherein the user is a child, and the supervisor is a parent of the child, and said supervisor communication device is a communication device of the parent.

21. The interface apparatus of claim 16, wherein the situation identification system is configured to communicate with at least one system providing a medical diagnostics service.

22. The interface apparatus of claim 15, wherein the user is a child, and the peer is another child.

* * * * *